US011283576B2

(12) United States Patent
Wu et al.

(10) Patent No.: US 11,283,576 B2
(45) Date of Patent: Mar. 22, 2022

(54) METHOD AND DEVICE IN UE AND BASE STATION USED FOR WIRELESS COMMUNICATION

(71) Applicants: Lu Wu, Shanghai (CN); XiaoBo Zhang, Shanghai (CN); Lin Yang, Shanghai (CN)

(72) Inventors: Lu Wu, Shanghai (CN); XiaoBo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 89 days.

(21) Appl. No.: 16/833,702

(22) Filed: Mar. 30, 2020

(65) Prior Publication Data

US 2020/0228288 A1    Jul. 16, 2020

Related U.S. Application Data

(63) Continuation of application No. PCT/CN2019/098837, filed on Aug. 1, 2019.

(30) Foreign Application Priority Data

Aug. 8, 2018   (CN) .......................... 201810894931.9

(51) Int. Cl.
*H04W 4/00* (2018.01)
*H04L 5/00* (2006.01)
(Continued)

(52) U.S. Cl.
CPC .......... *H04L 5/0053* (2013.01); *H04L 1/1861* (2013.01); *H04L 1/1864* (2013.01); *H04L 5/0007* (2013.01); *H04W 16/14* (2013.01)

(58) Field of Classification Search
CPC ................. H04L 5/0053; H04L 1/1861; H04L 1/1864; H04L 5/0007; H04L 5/0091;
(Continued)

(56) References Cited

U.S. PATENT DOCUMENTS

2012/0039279 A1*  2/2012  Chen ................. H04W 72/1284
                                                       370/329
2012/0281645 A1* 11/2012  Li ......................... H04L 1/1607
                                                       370/329
(Continued)

FOREIGN PATENT DOCUMENTS

CN        108024345 A       5/2018
WO        2018127628 A1     7/2018

OTHER PUBLICATIONS

ISR received in application No. PCT/CN2019/098837 dated Oct. 29, 2019.
(Continued)

*Primary Examiner* — Mang Hang Yeung

(57) ABSTRACT

The present disclosure discloses a method and a device used for wireless communication in a User Equipment (UE) and a base station. The UE receives a first radio signal and a second radio signal, and then transmits K first-type bit sequence(s) respectively in K time-frequency resource(s). A first bit block is used for indicating whether the first radio signal is correctly received, the first bit block comprises a positive integer number of bit(s); a second bit block comprises feedback to the second radio signal, the second bit block comprises a positive integer number of bit(s); each first-type bit sequence of the K first-type bit sequences comprises a positive integer number of bit(s); the first bit block and the second bit block are used for generating each first-type bit sequence of the K first-type bit sequence(s); the
(Continued)

K is a positive integer. The above method improves transmission reliability of control information.

18 Claims, 20 Drawing Sheets

(51) Int. Cl.
*H04L 1/18* (2006.01)
*H04W 16/14* (2009.01)

(58) Field of Classification Search
CPC .............. H04L 5/0057; H04L 5/0016; H04L 5/0055; H04W 72/04
USPC ........................................... 370/330
See application file for complete search history.

(56) References Cited

U.S. PATENT DOCUMENTS

2013/0034073 A1* 2/2013 Aiba .................. H04L 1/1887
370/329
2019/0181986 A1* 6/2019 Kitamura .............. H04L 1/1819

OTHER PUBLICATIONS

Xiaomi Communications, "On Remaining issues of UCI multiplexing", 3GPP TSG RAN WG1 Meeting #93, R1-1807168, May 25, 2018.
Huawei,HiSilicon, "Discussion on UCI feedback for URLLC",3GPP TSG RAN WG1 Meeting #90, R1-1712211, Aug. 25, 2017.
Institute for Information Industry (III), "Considerations for UCI for URLLC", 3GPP TSG RAN WG1 Meeting 90bis, R1-1718626, Oct. 13, 2017.

* cited by examiner

METHOD AND DEVICE IN UE AND BASE STATION USED FOR WIRELESS COMMUNICATION

CROSS-REFERENCE TO RELATED APPLICATION

This application is a continuation of International Application No. PCT/CN2019/098837, filed on Aug. 1, 2019, claiming the priority benefit of Chinese Application No. 201810894931.9, filed on Aug. 8, 2018, the full disclosure of which is incorporated herein by reference.

BACKGROUND

Technical Field

The present disclosure relates to transmission methods and devices in wireless communication systems, and in particular to a communication method and device that support data transmission on Unlicensed Spectrum.

Related Art

In 5G system, Enhance Mobile Broadband (eMBB) and Ultra Reliable and Low Latency Communication (URLLC) are two typical business types. In 3rd Generation Partner Project (3GPP) New Radio (NR) Release 15, a new Modulation and Coding Scheme (MCS) table targeting lower target Block Error Rate (BLER) required for URLLC business was defined.

With a purpose of supporting more demanding URLLC business, for example, with higher reliability (e.g., a target BLER is $10^{-6}$) or with lower delay (e.g., 0.5-1 ms), a Study Item (SI) on URLLC advancement in NR Release 16 was approved at the 3GPP Radio Access Network (RAN) #$80^{th}$ Plenary Session. In the SI, the advancement in Hybrid Automatic Repeat reQuest (HARQ) feedback/Channel State Information (CSI) feedback has been a focus of the study.

SUMMARY

The inventors have found through researches that Uplink Control Information (UCI) includes HARQ/CSI. In order to support more reliable transmission in NR Release 16, how to transmit UCI becomes a significant problem needed to be reconsidered.

In view of the above problem, the present disclosure provides a solution. It should be noted that the embodiments of the present disclosure and the characteristics in the embodiments can be arbitrarily combined if no conflict is incurred.

The present disclosure discloses a method in a User Equipment (UE) for wireless communication, comprising:
   receiving a first radio signal;
   receiving a second radio signal; and
   transmitting K first-type bit sequence(s) respectively in K time-frequency resource(s);
   herein, a first bit block is used for indicating whether the first radio signal is correctly received, the first bit block comprises a positive integer number of bit(s); a second bit block comprises feedback to the second radio signal, the second bit block comprises a positive integer number of bit(s); each first-type bit sequence of the K first-type bit sequence(s) comprises a positive integer number of bit(s); the first bit block and the second bit block are used for generating each first-type bit sequence of the K first-type bit sequence(s); K is a positive integer.

In one embodiment, the problem needed to be solved in the present disclosure is how to achieve advancement in UCI transmission in order to meet the requirement for higher reliability in NR Release 16.

In one embodiment, a problem needed to be solved in the present disclosure is: in NR Release 16, when UCI to be transmitted on a Physical Uplink Control CHannel (PUCCH) within a slot includes URLLC UCI and eMBB UCI, how to ensure higher reliability of URLLC UCI as the UCI is transmitted on the PUCCH becomes a significant problem to be solved.

In one embodiment, a problem needed to be solved in the present disclosure is: in NR Release 16, it is a research orientation to transmit a same piece of URLLC UCI repeatedly on multiple PUCCHs within a slot. Therefore, when UCI to be transmitted in a PUCCH within a slot includes URLLC UCI and eMBB UCI, how to transmit this piece of UCI on multiple PUCCHs is a significant problem to be solved.

In one embodiment, the essence of the above method lies in that when K is greater than 1, a first bit block is URLLC UCI, a second bit block is eMBB UCI, the first bit block and the second bit block are both transmitted in a same slot; K first-type bit sequences are K pieces of UCI generated by the first bit block and the second bit block, K time-frequency resources are K PUCCHs respectively used for transmitting the K pieces of UCI. An advantage of the above method is that if each of the K pieces of UCI includes URLLC UCI, higher transmission reliability of URLLC UCI can be ensured through repeated transmissions on multiple PUCCHs.

In one embodiment, the essence of the above method lies in that when K is equal to 1, a first bit block is URLLC UCI, a second bit block is eMBB UCI, the first bit block and the second bit block are both transmitted in a PUCCH resource within a slot. An advantage of the above method is that higher transmission reliability of URLLC UCI can be guaranteed if the UCI generated by the first bit block and the second bit block can be reasonably designed.

According to one aspect of the present disclosure, the above method is characterized in that the K first-type bit sequence(s) is(are) respectively generated by scrambling of K second-type bit sequence(s) and K scrambling sequence(s) correspondingly, the first bit block and the second bit block are used for generating each second-type bit sequence of the K second-type bit sequence(s), the K scrambling sequence(s) is(are) separately generated after a scrambling sequence generator is initialized by K initial value(s) respectively.

According to one aspect of the present disclosure, the above method is characterized in comprising:
   receiving first information; and
   receiving a first signaling;
   herein, the first information is used for indicating a first identifier, the first signaling is used for determining the K time-frequency resource(s); the first signaling is also used for indicating an MCS employed by the first radio signal out of a first target MCS set, the first target MCS set is an alternative MCS set of X alternative MCS sets, X is a positive integer greater than 1; the first signaling carries the first identifier, the first identifier is used for determining the first target MCS set out of the X alternative MCS sets.

In one embodiment, the essence of the above method lies in that a first identifier is a Radio Network Temporary Identifier (RNTI) for scrambling CRC of DCI in URLLC business, determining a first radio signal according to the first identifier is targeted at the URLLC business.

According to one aspect of the present disclosure, the above method is characterized in comprising:

receiving second information;

herein, the second information is used for determining time-frequency resources occupied by the second radio signal; the feedback to the second radio signal is used for indicating whether the second radio signal is correctly received, or the feedback to the second radio signal comprises Channel Status Information (CSI) generated after a measurement on the second radio signal.

According to one aspect of the present disclosure, the above method is characterized in comprising:

receiving third information;

herein, the feedback to the second radio signal is used for indicating whether the second radio signal is correctly received; the third information is used for indicating a second identifier, the second identifier is different from the first identifier, the second identifier is used for determining a second target MCS set out of the X alternative MCS sets, the second target MCS set and the first target MCS set are different; a second signaling carries the second information, the second signaling carries the second identifier, the second signaling is also used for indicating an MCS employed by the second radio signal out of the second target MCS set, a minimum target code rate of MCSs comprised in the second target MCS set is greater than a minimum target code rate of MCSs comprised in the first target MCS set.

In one embodiment, the essence of the above method lies in that a second identifier is an RNTI for scrambling CRC of DCI in eMBB business, determining a second radio signal according to the second identifier is targeted at the eMBB business.

According to one aspect of the present disclosure, the above method is characterized in comprising:

receiving fourth information;

herein, the fourth information is used for indicating N time-frequency resource sets; the first signaling is used for determining the K time-frequency resource(s) out of a first time-frequency resource set, the first time-frequency resource set is a time-frequency resource set of the N time-frequency resource sets. N is a positive integer greater than 1.

According to one aspect of the present disclosure, the above method is characterized in that K is greater than 1, the second bit block is divided into K bit sub-blocks, any bit sub-block of the K bit sub-blocks comprises a positive integer number of bit(s); the K bit sub-blocks are respectively used for generating the K first-type bit sequences.

In one embodiment, the essence of the above method lies in that a second bit block is eMBB UCI, each bit sub-block of the K bit sub-blocks only comprises part of bits in eMBB UCI, so that bits comprised in the eMBB UCI are respectively transmitted on K PUCCHs. An advantage of the above method lies in that the number of bits needed to be carried by each PUCCH is decreased, which means less PUCCH resource can be chosen for transmitting UCI, thereby enhancing both resource utilization and the system transmission capacity.

According to one aspect of the present disclosure, the above method is characterized in that K is greater than 1, bit(s) in each bit sub-block of the K bit sub-blocks is(are) concatenated with bit(s) comprised in the first bit block respectively to generate K target bit sub-blocks, outputs after the K target bit sub-blocks are respectively inputted to channel coding are used for generating the K first-type bit sequences respectively.

In one embodiment, an advantage of the above method is that each piece of K pieces of UCI includes URLLC UCI, therefore, higher transmission reliability of URLLC UCI can be guaranteed through repeated transmissions on the K PUCCHs.

According to one aspect of the present disclosure, the above method is characterized in that bit(s) comprised in the first bit block and bits comprised in the second bit block are concatenated to generate a third bit block, an output after the third bit block is inputted to channel coding is used for generating each first-type bit sequence of the K first-type bit sequences.

In one embodiment, an advantage of the above method is that when K is greater than 1, each piece of K pieces of UCI includes URLLC UCI and eMBB UCI, so repeated transmissions on K PUCCHs will enable the URLLC UCI and eMBB UCI to obtain higher transmission reliability.

According to one aspect of the present disclosure, the above method is characterized in comprising:

receiving fifth information;

herein, the first bit block comprises P bit sub-blocks, any two of the P bit sub-blocks are the same, P is a positive integer greater than 1, the fifth information is used for determining P, any bit sub-block of the P bit sub-blocks can be used for indicating whether the first radio signal is correctly received.

In one embodiment, the essence of the above method lies in that when K is greater than 1, UCI transmitted in each PUCCH resource consists of P repetitions of URLLC UCI combined with eMBB UCI. An advantage of the above method is that the code rate of the URLLC UCI transmitted in each PUCCH resource is reduced, thus further improving the transmission reliability of URLLC UCI in each PUCCH resource.

In one embodiment, the essence of the above method lies in that when K is equal to 1, UCI transmitted in a PUCCH resource consists of P repetitions of URLLC UCI combined with eMBB UCI. An advantage of the above method is that the code rate of URLLC UCI transmitted in this PUCCH resource is reduced, thus improving the transmission reliability of the URLLC UCI.

The present disclosure discloses a method in a base station for wireless communication, comprising:

transmitting a first radio signal;

transmitting a second radio signal; and receiving K first-type bit sequence(s) respectively in K time-frequency resource(s);

herein, any two time-frequency resources of the K time-frequency resources are orthogonal, K is a positive integer greater than 1; a first bit block is used for indicating whether the first radio signal is correctly received, the first bit block comprises a positive integer number of bit(s); a second bit block comprises feedback to the second radio signal, the second bit block comprises a positive integer number of bit(s); each first-type bit sequence of the K first-type bit sequences comprises a positive integer number of bit(s); the first bit block and the second bit block are used for generating each first-type bit sequence of the K first-type bit sequences.

According to one aspect of the present disclosure, the above method is characterized in that the K first-type bit sequences are respectively generated by scrambling of K second-type bit sequences and K scrambling sequences correspondingly, the first bit block and the second bit block are used for generating each second-type bit sequence of the K second-type bit sequences, the K scrambling sequences are separately generated after a scrambling sequence generator is initialized by K initial values respectively.

According to one aspect of the present disclosure, the above method is characterized in comprising:

transmitting first information;

transmitting a first signaling;

herein, the first information is used for indicating a first identifier, the first signaling is used for determining the K time-frequency resource(s); the first signaling is also used for indicating an MCS employed by the first radio signal out of a first target MCS set, the first target MCS set is an alternative MCS set of X alternative MCS sets, X is a positive integer greater than 1; the first signaling carries the first identifier, the first identifier is used for determining the first target MCS set out of the X alternative MCS sets.

According to one aspect of the present disclosure, the above method is characterized in comprising:

transmitting second information;

herein, the second information is used for determining time-frequency resources occupied by the second radio signal; the feedback to the second radio signal is used for indicating whether the second radio signal is correctly received, or the feedback to the second radio signal comprises CSI generated after a measurement on the second radio signal.

According to one aspect of the present disclosure, the above method is characterized in comprising:

transmitting third information;

herein, the feedback to the second radio signal is used for indicating whether the second radio signal is correctly received; the third information is used for indicating a second identifier, the second identifier is different from the first identifier, the second identifier is used for determining a second target MCS set out of the X alternative MCS sets, the second target MCS set and the first target MCS set are different; a second signaling carries the second information, the second signaling carries the second identifier, the second signaling is also used for indicating an MCS employed by the second radio signal out of the second target MCS set, a minimum target code rate of MCSs comprised in the second target MCS set is greater than a minimum target code rate of MCSs comprised in the first target MCS set.

According to one aspect of the present disclosure, the above method is characterized in comprising:

transmitting fourth information;

herein, the fourth information is used for indicating N time-frequency resource sets; the first signaling is used for determining the K time-frequency resource(s) out of a first time-frequency resource set, the first time-frequency resource set is a time-frequency resource set of the N time-frequency resource sets. N is a positive integer greater than 1.

According to one aspect of the present disclosure, the above method is characterized in that the second bit block is divided into K bit sub-blocks, any bit sub-block of the K bit sub-blocks comprises a positive integer number of bit(s); the K bit sub-blocks are respectively used for generating the K first-type bit sequences.

According to one aspect of the present disclosure, the above method is characterized in that bit(s) in each bit sub-block of the K bit sub-blocks is(are) concatenated with bit(s) comprised in the first bit block respectively to generate K target bit sub-blocks, outputs after the K target bit sub-blocks are respectively inputted to channel coding are used for generating the K first-type bit sequences respectively.

According to one aspect of the present disclosure, the above method is characterized in that bit(s) comprised in the first bit block and bits comprised in the second bit block are concatenated to generate a third bit block, an output after the third bit block is inputted to channel coding is used for generating each first-type bit sequence of the K first-type bit sequences.

According to one aspect of the present disclosure, the above method is characterized in comprising:

transmitting fifth information;

herein, the first bit block comprises P bit sub-blocks, any two of the P bit sub-blocks are the same, P is a positive integer greater than 1, the fifth information is used for determining P, any bit sub-block of the P bit sub-blocks can be used for indicating whether the first radio signal is correctly received.

The present disclosure discloses a UE for wireless communication, comprising:

a first receiver, receiving a first radio signal; and receiving a second radio signal; and a first transmitter, transmitting K first-type bit sequence(s) respectively in K time-frequency resource(s);

herein, a first bit block is used for indicating whether the first radio signal is correctly received, the first bit block comprises a positive integer number of bit(s); a second bit block comprises feedback to the second radio signal, the second bit block comprises a positive integer number of bit(s); each first-type bit sequence of the K first-type bit sequence(s) comprises a positive integer number of bit(s); the first bit block and the second bit block are used for generating each first-type bit sequence of the K first-type bit sequence(s); K is a positive integer.

The present disclosure discloses a base station for wireless communication, comprising:

a second transmitter, transmitting a first radio signal; and transmitting a second radio signal; and a second receiver, receiving K first-type bit sequence(s) respectively in K time-frequency resource(s);

wherein a first bit block is used for indicating whether the first radio signal is correctly received, the first bit block comprises a positive integer number of bit(s); a second bit block comprises feedback to the second radio signal, the second bit block comprises a positive integer number of bit(s); each first-type bit sequence of the K first-type bit sequence(s) comprises a positive integer number of bit(s); the first bit block and the second bit block are used for generating each first-type bit sequence of the K first-type bit sequence(s); K is a positive integer.

In one embodiment, the present disclosure has the following advantages over the prior art:

The present disclosure ensures that the requirement for higher reliability of URLLC UCI transmission can be met when both URLLC UCI and eMBB UCI are transmitted on a PUCCH within a slot.

The requirement for higher reliability of URLLC UCI transmission is satisfied by repeatedly transmitting URLLC UCI in multiple PUCCH resources when both URLLC UCI and eMBB UCI are transmitted on a PUCCH within a slot.

The requirement for higher reliability of URLLC UCI transmission is satisfied by repeatedly transmitting URLLC UCI in multiple PUCCH resources when both URLLC UCI and eMBB UCI are transmitted on a PUCCH within a slot. In addition, bits comprised in the eMBB UCI are respectively transmitted in the multiple PUCCH resources, which helps reduce the number of bits needed to be carried by each PUCCH resource, therefore, less PUCCH resource can be chosen to transmit UCI, thereby increasing resource utilization and system transmission capacity.

When URLLC UCI and eMBB UCI are transmitted on a PUCCH within a slot, repeatedly transmitting URLLC UCI and eMBB UCI in multiple PUCCH resources enables higher reliability of URLLC UCI transmission and higher eMBB UCI transmission.

When URLLC UCI and eMBB UCI are transmitted on a PUCCH within a slot, UCI transmitted on each PUCCH is composed of multiple repetitions of URLLC UCI combined with eMBB UCI, which reduces the code rate of URLLC UCI transmitted in each PUCCH resource, further increasing transmission reliability of URLLC UCI in each PUCCH resource.

Through repeated transmission of URLLC UCI and a transmission of eMBB UCI in only one PUCCH resource within a slot, the code rate of the URLLC UCI transmitted in the PUCCH resource can be cut down, thus enhancing URLLC UCI transmission reliability.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
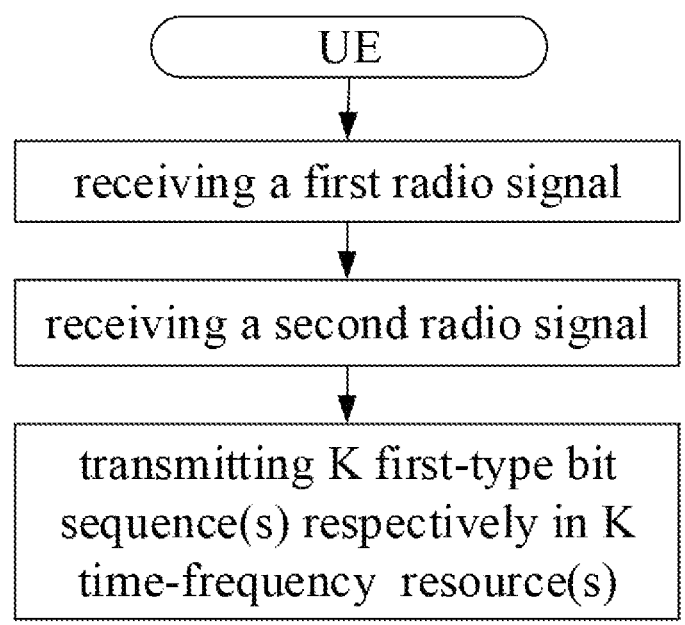
FIG. 1 illustrates a flowchart of a first radio signal, a second radio signal and K first-type bit sequence(s) according to one embodiment of the present disclosure.

Embodiment 1 illustrates a flowchart of a first radio signal, a second radio signal and K first-type bit sequence(s), as shown in FIG. 1.

In Embodiment 1, the UE in the present disclosure receives a first radio signal; receives a second radio signal; and transmits K first-type bit sequence(s) respectively in K time-frequency resource(s); herein, a first bit block is used for indicating whether the first radio signal is correctly received, the first bit block comprises a positive integer number of bit(s); a second bit block comprises feedback to the second radio signal, the second bit block comprises a positive integer number of bit(s); each first-type bit sequence of the K first-type bit sequence(s) comprises a positive integer number of bit(s); the first bit block and the second bit block are used for generating each first-type bit sequence of the K first-type bit sequence(s); K is a positive integer.

In one embodiment, K is equal to 1.

In one embodiment, K is greater than 1.

In one embodiment, the first radio signal comprises data.

In one embodiment, the first radio signal comprises data and DeModulation Reference Signals (DMRS).

In one embodiment, the data comprised in the first radio signal is downlink data.

In one embodiment, the first radio signal is acquired after a Transport Block (TB) is sequentially subjected to CRC Insertion, Channel Coding, Rate Matching, Scrambling, Modulation, Layer Mapping, Precoding, Mapping to Resource Element, Orthogonal Frequency Division Multiplexing (OFDM) Baseband Signal Generation, and Modulation and Upconversion.

In one embodiment, the first radio signal is acquired after a TB is sequentially subjected to CRC Insertion, Channel Coding, Rate Matching, Scrambling, Modulation, Layer Mapping, Precoding, Mapping to Virtual Resource Blocks, Mapping from Virtual to Physical Resource Blocks, OFDM Baseband Signal Generation, and Modulation and Upconversion.

In one embodiment, the first radio signal is acquired after a TB is sequentially subjected to CRC Insertion, Segmentation, coding block-level CRC Insertion, Channel Coding, Rate Matching, Concatenation, Scrambling, Modulation, Layer Mapping, Precoding, Mapping to Resource Element, OFDM Baseband Signal Generation, and Modulation and Upconversion.

In one embodiment, a transmission channel for the first radio signal is a Downlink Shared Channel (DL-SCH).

In one embodiment, the first radio signal is transmitted on a downlink physical layer data channel (i.e., a downlink channel capable of carrying physical layer data).

In one sub-embodiment of the above embodiment, the downlink physical layer data channel is a Physical Downlink Shared CHannel (PDSCH).

In one sub-embodiment of the above embodiment, the downlink physical layer data channel is a short PDSCH (sPDSCH).

In one sub-embodiment of the above embodiment, the downlink physical layer data channel is a New Radio PDSCH (NR-PDSCH).

In one sub-embodiment of the above embodiment, the downlink physical layer data channel is a Narrow Band PDSCH (NB-PDSCH).

In one embodiment, the second radio signal comprises data; or the second radio signal comprises data and DMRS.

In one sub-embodiment of the above embodiment, the second radio signal comprises data.

In one sub-embodiment of the above embodiment, the second radio signal comprises data and DMRS.

In one sub-embodiment of the above embodiment, the data comprised by the second radio signal is downlink data.

In one sub-embodiment of the above embodiment, the second radio signal is acquired after a TB is sequentially subjected to CRC Insertion, Channel Coding, Rate Matching, Scrambling, Modulation, Layer Mapping, Precoding, Mapping to Resource Element, OFDM Baseband Signal Generation, and Modulation and Upconversion.

In one sub-embodiment of the above embodiment, the second radio signal is acquired after a TB is sequentially subjected to CRC Insertion, Channel Coding, Rate Matching, Scrambling, Modulation, Layer Mapping, Precoding, Mapping to Virtual Resource Blocks, Mapping from Virtual to Physical Resource Blocks, OFDM Baseband Signal Generation, and Modulation and Upconversion.

In one sub-embodiment of the above embodiment, the second radio signal is acquired after a TB is sequentially subjected to CRC Insertion, Segmentationcoding block-level CRC Insertion, Channel Coding, Rate Matching, Concatenation, Scrambling, Modulation, Layer Mapping, Precoding, Mapping to Resource Element, OFDM Baseband Signal Generation, and Modulation and Upconversion.

In one embodiment, the second radio signal comprises a reference signal.

In one sub-embodiment of the above embodiment, the reference signal comprised in the second radio signal comprises Channel State Information-Reference Signal (CSI-RS).

In one sub-embodiment of the above embodiment, the reference signal comprised in the second radio signal comprises CSI-RS and CSI-interference measurement resource (CSI-IMR).

In one embodiment, a transmission channel for the second radio signal is a DL-SCH.

In one embodiment, the second radio signal is transmitted on a downlink physical layer data channel (i.e., a downlink channel capable of carrying physical layer data).

In one sub-embodiment of the above embodiment, the downlink physical layer data channel is a PDSCH.

In one sub-embodiment of the above embodiment, the downlink physical layer data channel is an sPDSCH.

In one sub-embodiment of the above embodiment, the downlink physical layer data channel is an NR-PDSCH.

In one sub-embodiment of the above embodiment, the downlink physical layer data channel is an NB-PDSCH.

In one embodiment, the first bit block explicitly indicates whether the first radio signal is correctly received.

In one embodiment, the first bit block implicitly indicates whether the first radio signal is correctly received.

In one embodiment, the first bit block comprises Hybrid Automatic Repeat reQuest ACKnowledgement (HARQ-ACK) feedback to the first radio signal.

In one embodiment, the second bit block comprises HARQ-ACK feedback or Channel State Information (CSI) feedback.

In one embodiment, the second bit block comprises HARQ-ACK feedback.

In one embodiment, the second bit block comprises CSI feedback.

In one embodiment, the K is greater than 1, any two of the K time-frequency resources are orthogonal.

In one embodiment, the K is greater than 1, all of the K time-frequency resources comprise a same subcarrier(s) in frequency domain.

In one embodiment, the K is greater than 1, all of the K time-frequency resources comprise same numbers of subcarriers in frequency domain.

In one embodiment, the K is greater than 1, all of the K time-frequency resources comprise same numbers of multicarrier symbols in time domain.

In one embodiment, the K is greater than 1, the K time-frequency resources are consecutive in time domain.

In one embodiment, the K is greater than 1, at least two adjacent time-frequency resources of the K time-frequency resources are non-consecutive in time domain.

In one embodiment, the K is greater than 1, the K time-frequency resources respectively comprise equal numbers of Resource Elements (REs).

In one embodiment, each of the K time-frequency resource(s) belongs to a first time window.

In one sub-embodiment of the above embodiment, the first time window comprises a slot.

In one sub-embodiment of the above embodiment, the first time window comprises a subframe.

In one sub-embodiment of the above embodiment, the first time window comprises multiple slots.

In one sub-embodiment of the above embodiment, the first time window comprises multiple subframes.

In one sub-embodiment of the above embodiment, the first time window comprises a positive integer number of multicarrier symbol(s).

In one embodiment, the multicarrier symbol is an OFDM symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the multicarrier symbol is a Filter Bank Multi Carrier (FBMC) symbol.

In one embodiment, the multicarrier symbol comprises Cyclic Prefix (CP).

In one embodiment, each of the K time-frequency resource(s) belongs to an uplink physical layer control channel (i.e., an uplink channel only capable of carrying a physical layer signaling).

In one sub-embodiment of the above embodiment, the uplink physical layer control channel is a PUCCH.

In one sub-embodiment of the above embodiment, the uplink physical layer control channel is a short PUCCH (sPUCCH).

In one sub-embodiment of the above embodiment, the uplink physical layer control channel is a New Radio PUCCH (NR-PUCCH).

In one sub-embodiment of the above embodiment, the uplink physical layer control channel is a Narrow Band PUCCH (NB-PUCCH).

In one embodiment, the K is greater than 1, any two of the K first-type bit sequences comprise equal numbers of bits.

In one embodiment, the K is greater than 1, any two of the K first-type bit sequences comprise different numbers of bits.

In one embodiment, the K is greater than 1, at least two of the K first-type bit sequences comprise different numbers of bits.

In one embodiment, the K is greater than 1, the K first-type bit sequences are the same.

In one embodiment, the K is greater than 1, there are two first-type bit sequences out of the K first-type bit sequences that are different.

In one embodiment, the K is greater than 1, at least two of the K first-type bit sequences are different from each other.

Embodiment 2

Figure 2:
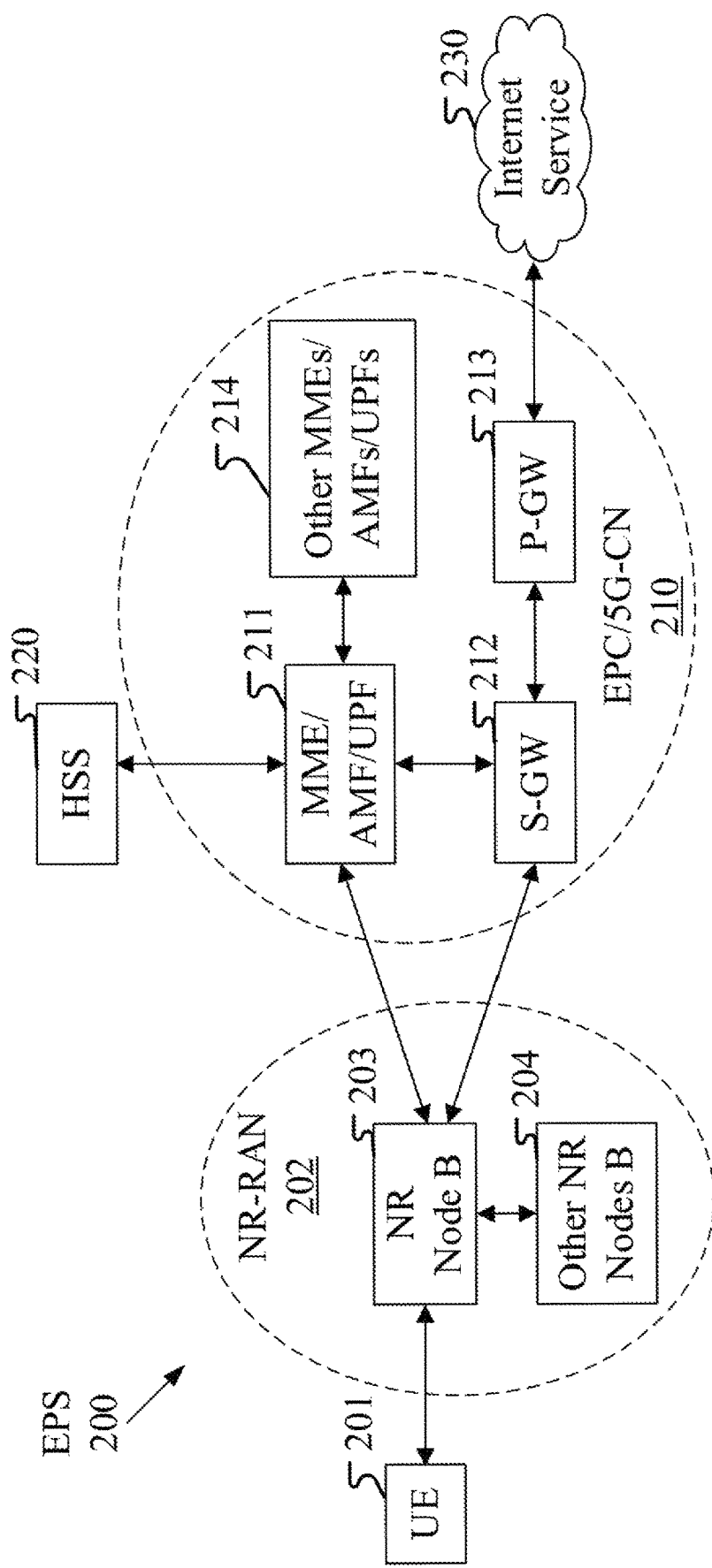
FIG. 2 illustrates a schematic diagram of a network architecture according to one embodiment of the present disclosure.

Embodiment 2 illustrates a schematic diagram of a network architecture, as shown in FIG. 2.

Embodiment 2 illustrates a schematic diagram of a network architecture according to the present disclosure, as shown in FIG. 2. FIG. 2 is a diagram illustrating a network architecture 200 of NR 5G, Long-Term Evolution (LTE) and Long-Term Evolution Advanced (LTE-A) systems. The NR 5G or LTE network architecture 200 may be called an Evolved Packet System (EPS) 200 or other applicable terminology. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, Satellite Mobile Communications, Global Positioning Systems (GPSs), multimedia devices, video devices, digital audio players (for example, MP3 players), cameras, game consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity/Authentication Management Field/User Plane Function (MME/AMF/UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the UE in the present disclosure.

In one embodiment, the gNB203 corresponds to the base station in the present disclosure.

In one embodiment, the UE 201 supports MIMO wireless communication.

In one embodiment, the gNB203 supports MIMO wireless communication.

In one embodiment, the UE 201 supports massive MIMO wireless communication.

In one embodiment, the gNB203 supports massive MIMO wireless communication.

Embodiment 3

Figure 3:
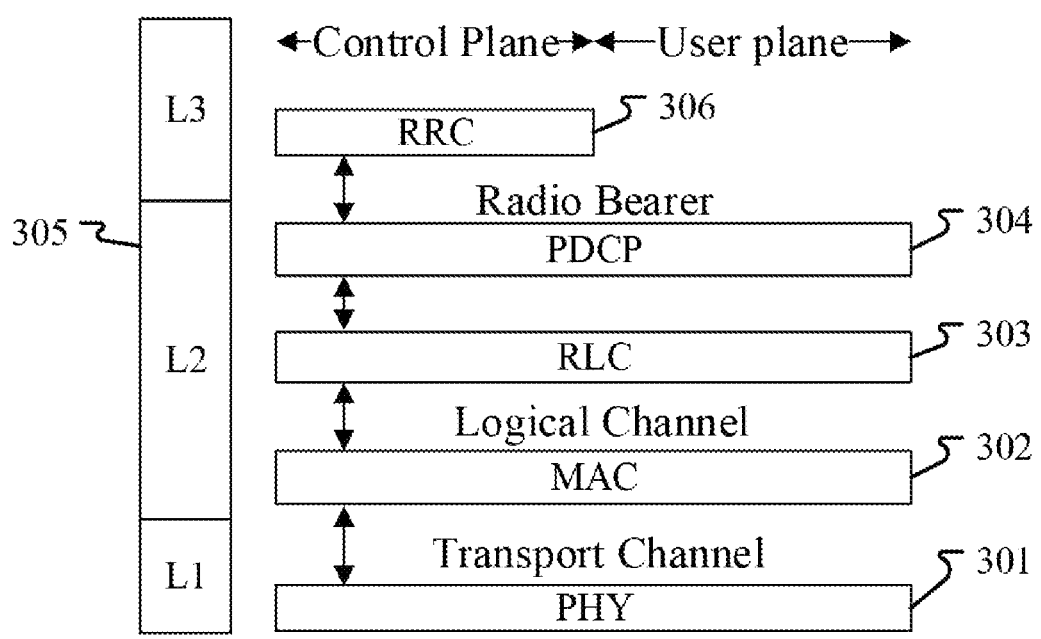
FIG. 3 illustrates a schematic diagram of a radio protocol architecture of a user plane and a control plane according to one embodiment of the present disclosure.

Embodiment 3 illustrates a schematic diagram of an embodiment of a radio protocol architecture of a user plane and a control plane according to the present disclosure, as shown in FIG. 3.

FIG. 3 is a schematic diagram illustrating a radio protocol architecture of a user plane and a control plane. In FIG. 3, the radio protocol architecture for a UE and a base station (gNB or eNB) is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several higher layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between UEs various radio resources (i.e., resource block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises a Radio Resource Control (RRC) sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio architecture in FIG. 3 is applicable to the UE in the present disclosure.

In one embodiment, the radio architecture in FIG. 3 is applicable to the base station in the present disclosure.

In one embodiment, the first radio signal in the present disclosure is generated by the PHY301.

In one embodiment, the second radio signal in the present disclosure is generated by the PHY301.

In one embodiment, the K first-type bit sequence(s) in the present disclosure is(are) generated by the PHY301.

In one embodiment, the first information in the present disclosure is generated by the RRC sublayer 306.

In one embodiment, the first information in the present disclosure is generated by the MAC sublayer 302.

In one embodiment, the second information in the present disclosure is generated by the RRC sublayer 306.

In one embodiment, the second information in the present disclosure is generated by the MAC sublayer 302.

In one embodiment, the second information in the present disclosure is generated by the PHY 301.

In one embodiment, the first signaling in the present disclosure is generated by the PHY 301.

In one embodiment, the third information in the present disclosure is generated by the RRC sublayer 306.

In one embodiment, the third information in the present disclosure is generated by the MAC sublayer 302.

In one embodiment, the fourth information in the present disclosure is generated by the RRC sublayer 306.

In one embodiment, the fourth information in the present disclosure is generated by the MAC sublayer 302.

In one embodiment, the fifth information in the present disclosure is generated by the RRC sublayer 306.

In one embodiment, the fifth information in the present disclosure is generated by the MAC sublayer 302.

In one embodiment, the fifth information in the present disclosure is generated by the PHY 301.

In one embodiment, the sixth information in the present disclosure is generated by the RRC sublayer 306.

In one embodiment, the sixth information in the present disclosure is generated by the MAC sublayer 302.

In one embodiment, the second signaling in the present disclosure is generated by the PHY 301.

In one embodiment, the second signaling in the present disclosure is generated by the RRC sublayer 306.

In one embodiment, the second signaling in the present disclosure is generated by the MAC sublayer 302.

Embodiment 4

Figure 4:
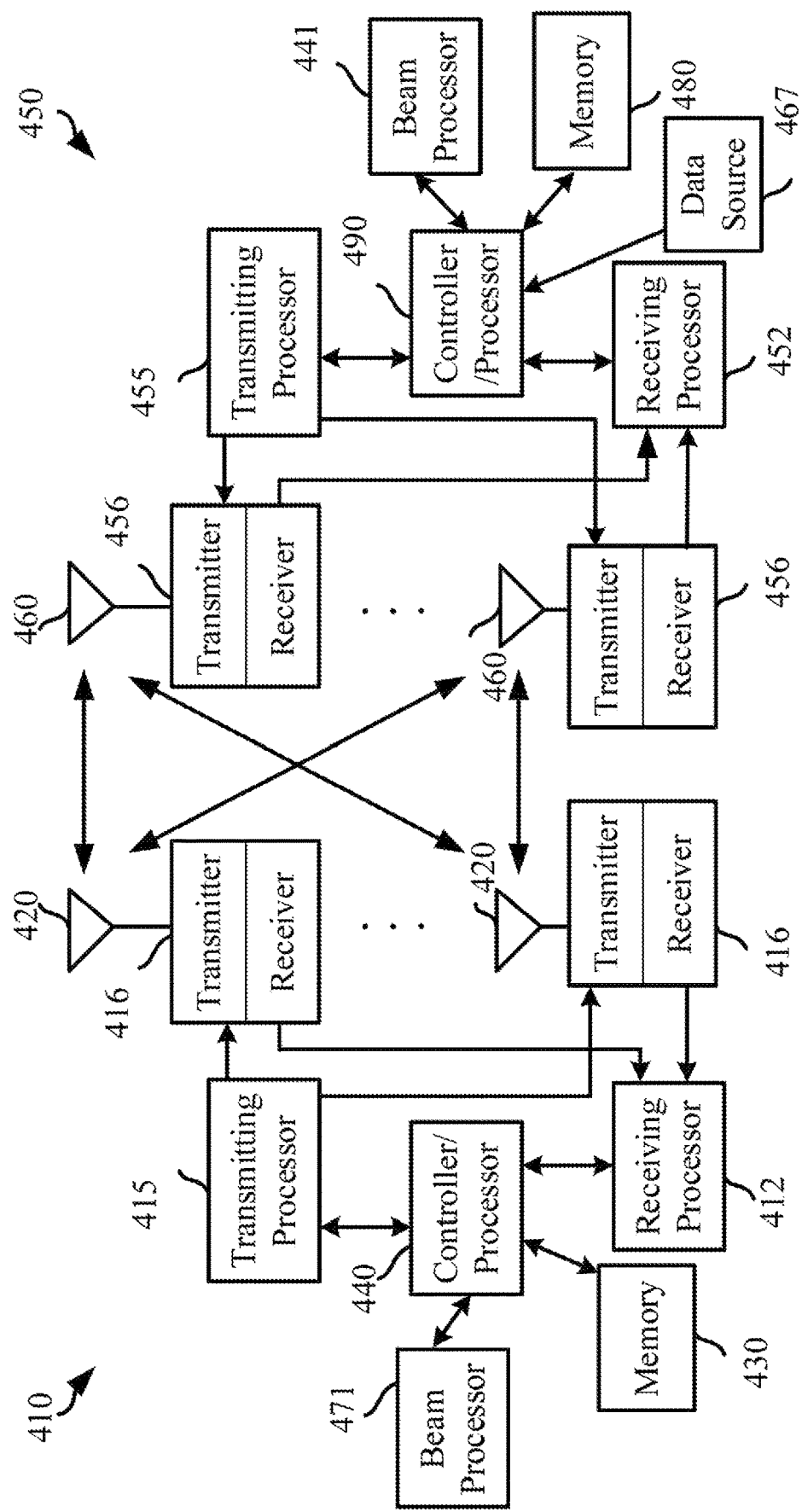
FIG. 4 illustrates a schematic diagram of a New Radio (NR) node and a UE according to one embodiment of the present disclosure.

Embodiment 4 illustrates a schematic diagram of a base station and a UE according to the present disclosure, as shown in FIG. 4. FIG. 4 is a block diagram of a gNB410 in communication with a UE450 in access network.

A base station (410) comprises a controller/processor 440, a memory 430, a receiving processor 412, a beam processor 471, a transmitting processor 415 a transmitter/receiver 416 and an antenna 420.

A UE (450) comprises a controller/processor 490, a memory 480, a data source 467, a beam processor 441, a transmitting processor 455, a receiving processor 452, a transmitter/receiver 456 and an antenna 460.

In downlink (DL) transmission, processes relevant to the base station (410) include the following:

A higher layer packet is provided to the controller/processor 440, which then provides header compression, encryption, packet segmentation and reordering, and multiplexing and demultiplexing between a logical channel and a transport channel so as to implements the L2 protocols used for the user plane and the control plane; the higher layer packet may comprise data or control information, for example, a DL-SCH;

the controller/processor 440 is connected to the memory 430 that stores program code and data, the memory 430 may be a computer readable medium;

the controller/processor 440 comprises scheduling units for transmission requests, wherein the scheduling units schedule radio resources corresponding to transmission requests;

the beam processor 471 determines to transmit a first radio signal and a second radio signal;

the transmitting processor 415 receives a bit stream output from the controller/processor 440 to perform signal transmitting processing functions for the L1 (that is, PHY), including coding, interleaving, scrambling, modulation, power control/allocation and generation of physical layer control signaling (such as PBCH, PDCCH, PHICH, PCFICH, and reference signal);

the transmitting processor 415 receives a bit stream output from the controller/processor 440 to perform signal transmitting processing functions for the L1 (that is, PHY), including multi-antenna transmission, spreading, code division multiplexing, and precoding;

the transmitter 416 is configured to convert a baseband signal provided by the transmitting processor 415 into a radio frequency signal to be transmitted via the antenna 420; each transmitter 416 performs sampling processing on respective input symbol streams to obtain respective sampled signal streams. Each transmitter 416 performs further processing (for example, digital-to-analogue conversion, amplification, filtering, upconversion, etc.) on respective sampled streams to obtain a downlink signal.

In DL transmission, processes relevant to the UE (450) include the following:

The receiver 456 is configured to convert the radio frequency signal received by the antenna 460 into a baseband signal and provide the baseband signal to the receiving processor 452;

the receiving processor 452 implements various signal receiving processing functions used for the L1 layer (that is, PHY), including decoding, deinterleaving, descrambling, demodulation and extraction of physical layer control signaling;

the receiving processor 452 implements various signal receiving processing functions used for the L1 layer (that is, PHY), including multi-antenna reception, dispreading, code division multiplexing, and precoding;

the beam processor 441 determines to receive a first radio signal and a second radio signal;

the controller/processor 490 receives a bit stream output from the receiving processor 452, provides header decompression, decryption, packet segmentation and reordering as well as a multiplexing and demultiplexing between a logical channel and a transport channel so as to implement the L2 layer protocols for the user plane and the control plane;

the controller/processor 490 is connected to the memory 480 that stores program codes and data. The memory 480 may be called a computer readable medium.

In uplink (UL) transmission, processes relevant to the base station (410) include the following:

The receiver 416 receives a radio frequency signal via a corresponding antenna 420, converts the received radio frequency signal into a baseband signal, and provides the baseband signal to the receiving processor 412;

the receiving processor 412 performs various signal receiving processing functions for the L1 layer (that is, PHY), including decoding, deinterleaving, descrambling, demodulation and extraction of physical layer control signaling;

the receiving processor 412 performs various signal receiving processing functions for the L1 layer (that is, PHY), including multi-antenna reception, despreading, code division multiplexing, and precoding, etc.;

the controller/processor 440 implements the functionality of the L2 layer, and is connected to the memory 430 that stores program codes and data;

the controller/processor 440 provides demultiplexing between a transport channel and a logical channel, packet reassembling, decryption, header decompression, and control signal processing to recover a higher layer packet coming from the UE 450; a higher layer packet from the controller/processor 440 can be provided to the core network;

the beam processor 471 determines to receive K first-type bit sequence(s) respectively in K time-frequency resource(s).

In UL transmission, processes relevant to the UE (450) include the following:

The data source 467 provides a higher layer packet to the controller/processor 490. The data source 467 represents all protocol layers above the L2 layer;

the transmitter 456 transmits a radio frequency signal via a corresponding antenna 460, converting the baseband signal into a radio frequency signal, and providing the radio frequency signal to a corresponding antenna 460;

the transmitting processor 455 performs various signal receiving processing functions for the L1 layer (that is, PHY), including coding, interleaving, scrambling, modulation and physical layer signaling generation;

the transmitting processor 455 performs various signal receiving processing functions for the L1 layer (that is, PHY), including multi-antenna transmission, spreading, code division multiplexing, and precoding;

the controller/processor 490 performs based on radio resource allocation for the gNB410 header compression, encryption, packet segmentation and reordering and multiplexing between a logical channel and a transport channel, so as to implement the L2 functionality used for the user plane and the control plane;

the controller/processor 490 is also in charge of HARQ operation, retransmission of a lost packet, and a signaling to the gNB410;

the beam processor 441 determines to transmit K first-type bit sequence(s) respectively in K time-frequency resource(s).

In one embodiment, the UE 450 comprises at least one processor and at least one memory. The at least one memory comprises computer program codes; the at least one memory and the computer program codes are configured to be used in collaboration with the at least one processor. The UE 450 at least receives a first radio signal; receives a second radio signal; and transmits K first-type bit sequence(s) respectively in K time-frequency resource(s); herein, a first bit block is used for indicating whether the first radio signal is correctly received, the first bit block comprises a positive integer number of bit(s); a second bit block comprises feedback to the second radio signal, the second bit block comprises a positive integer number of bit(s); each first-type bit sequence of the K first-type bit sequence(s) comprises a positive integer number of bit(s); the first bit block and the second bit block are used for generating each first-type bit sequence of the K first-type bit sequence(s); K is a positive integer.

In one embodiment, the UE 450 comprises a memory that stores a computer readable instruction program. The computer readable instruction program generates an action when executed by at least one processor. The action includes receiving a first radio signal; receiving a second radio signal; and transmitting K first-type bit sequence(s) respectively in K time-frequency resource(s); herein, a first bit block is used for indicating whether the first radio signal is correctly received, the first bit block comprises a positive integer number of bit(s); a second bit block comprises feedback to the second radio signal, the second bit block comprises a positive integer number of bit(s); each first-type bit sequence of the K first-type bit sequence(s) comprises a positive integer number of bit(s); the first bit block and the second bit block are used for generating each first-type bit sequence of the K first-type bit sequence(s); K is a positive integer.

In one embodiment, the gNB410 comprises at least one processor and at least one memory. The at least one memory comprises computer program codes. The at least one memory and the computer program codes are configured to be used in collaboration with the at least one processor. The gNB 410 at least transmits a first radio signal; transmits a second radio signal; and receives K first-type bit sequence(s) respectively in K time-frequency resource(s); herein, a first bit block is used for indicating whether the first radio signal is correctly received, the first bit block comprises a positive integer number of bit(s); a second bit block comprises feedback to the second radio signal, the second bit block comprises a positive integer number of bit(s); each first-type bit sequence of the K first-type bit sequence(s) comprises a positive integer number of bit(s); the first bit block and the second bit block are used for generating each first-type bit sequence of the K first-type bit sequence(s); K is a positive integer.

In one embodiment, the gNB410 comprises a memory that stores a computer readable instruction program. The computer readable instruction program generates an action when executed by at least one processor. The action includes transmitting a first radio signal; transmitting a second radio signal; and receiving K first-type bit sequence(s) respectively in K time-frequency resource(s); herein, a first bit block is used for indicating whether the first radio signal is correctly received, the first bit block comprises a positive integer number of bit(s); a second bit block comprises feedback to the second radio signal, the second bit block comprises a positive integer number of bit(s); each first-type bit sequence of the K first-type bit sequence(s) comprises a positive integer number of bit(s); the first bit block and the second bit block are used for generating each first-type bit sequence of the K first-type bit sequence(s); K is a positive integer.

In one embodiment, the UE 450 corresponds to the UE in the present disclosure.

In one embodiment, the gNB410 corresponds to the base station in the present disclosure.

In one embodiment, at least the first two of the receiver 456, the receiving processor 452 and the controller/processor 490 are used for receiving the first radio signal in the present disclosure.

In one embodiment, at least the first two of the transmitter 416, the transmitting processor 415 and the controller/processor 440 are used for transmitting the first radio signal in the present disclosure.

In one embodiment, at least the first two of the receiver 456, the receiving processor 452 and the controller/processor 490 are used for receiving the second radio signal in the present disclosure.

In one embodiment, at least the first two of the transmitter 416, the transmitting processor 415 and the controller/processor 440 are used for transmitting the second radio signal in the present disclosure.

In one embodiment, at least the first two of the receiver 456, the receiving processor 452 and the controller/processor 490 are used for receiving the first information in the present disclosure.

In one embodiment, at least the first two of the transmitter 416, the transmitting processor 415 and the controller/processor 440 are used for transmitting the first information in the present disclosure.

In one embodiment, at least the first two of the receiver 456, the receiving processor 452 and the controller/processor 490 are used for receiving the first signaling in the present disclosure.

In one embodiment, at least the first two of the transmitter 416, the transmitting processor 415 and the controller/processor 440 are used for transmitting the first signaling in the present disclosure.

In one embodiment, at least the first two of the receiver 456, the receiving processor 452 and the controller/processor 490 are used for receiving the second information in the present disclosure.

In one embodiment, at least the first two of the transmitter 416, the transmitting processor 415 and the controller/processor 440 are used for transmitting the second information in the present disclosure.

In one embodiment, at least the first two of the receiver 456, the receiving processor 452 and the controller/processor 490 are used for receiving the third information in the present disclosure.

In one embodiment, at least the first two of the transmitter 416, the transmitting processor 415 and the controller/processor 440 are used for transmitting the third information in the present disclosure.

In one embodiment, at least the first two of the receiver 456, the receiving processor 452 and the controller/processor 490 are used for receiving the fourth information in the present disclosure.

In one embodiment, at least the first two of the transmitter 416, the transmitting processor 415 and the controller/processor 440 are used for transmitting the fourth information in the present disclosure.

In one embodiment, at least the first two of the receiver 456, the receiving processor 452 and the controller/processor 490 are used for receiving the fifth information in the present disclosure.

In one embodiment, at least the first two of the transmitter 416, the transmitting processor 415 and the controller/processor 440 are used for transmitting the fifth information in the present disclosure.

In one embodiment, at least the first two of the receiver 456, the receiving processor 452 and the controller/processor 490 are used for receiving the sixth information in the present disclosure.

In one embodiment, at least the first two of the transmitter 416, the transmitting processor 415 and the controller/processor 440 are used for transmitting the sixth information in the present disclosure.

In one embodiment, at least the first two of the receiver 456, the receiving processor 452 and the controller/processor 490 are used for receiving the second signaling in the present disclosure.

In one embodiment, at least the first two of the transmitter 416, the transmitting processor 415 and the controller/processor 440 are used for transmitting the second signaling in the present disclosure.

In one embodiment, at least the first two of the transmitter 456, the transmitting processor 455 and the controller/processor 490 are used for transmitting the K first-type bit sequence(s) of the present disclosure respectively in the K time-frequency resource(s) of the present disclosure.

In one embodiment, at least the first two of the receiver 416, the receiving processor 412 and the controller/processor 440 are used for receiving the K first-type bit sequence(s) of the present disclosure respectively in the K time-frequency resource(s) of the present disclosure.

Embodiment 5

Figure 5:
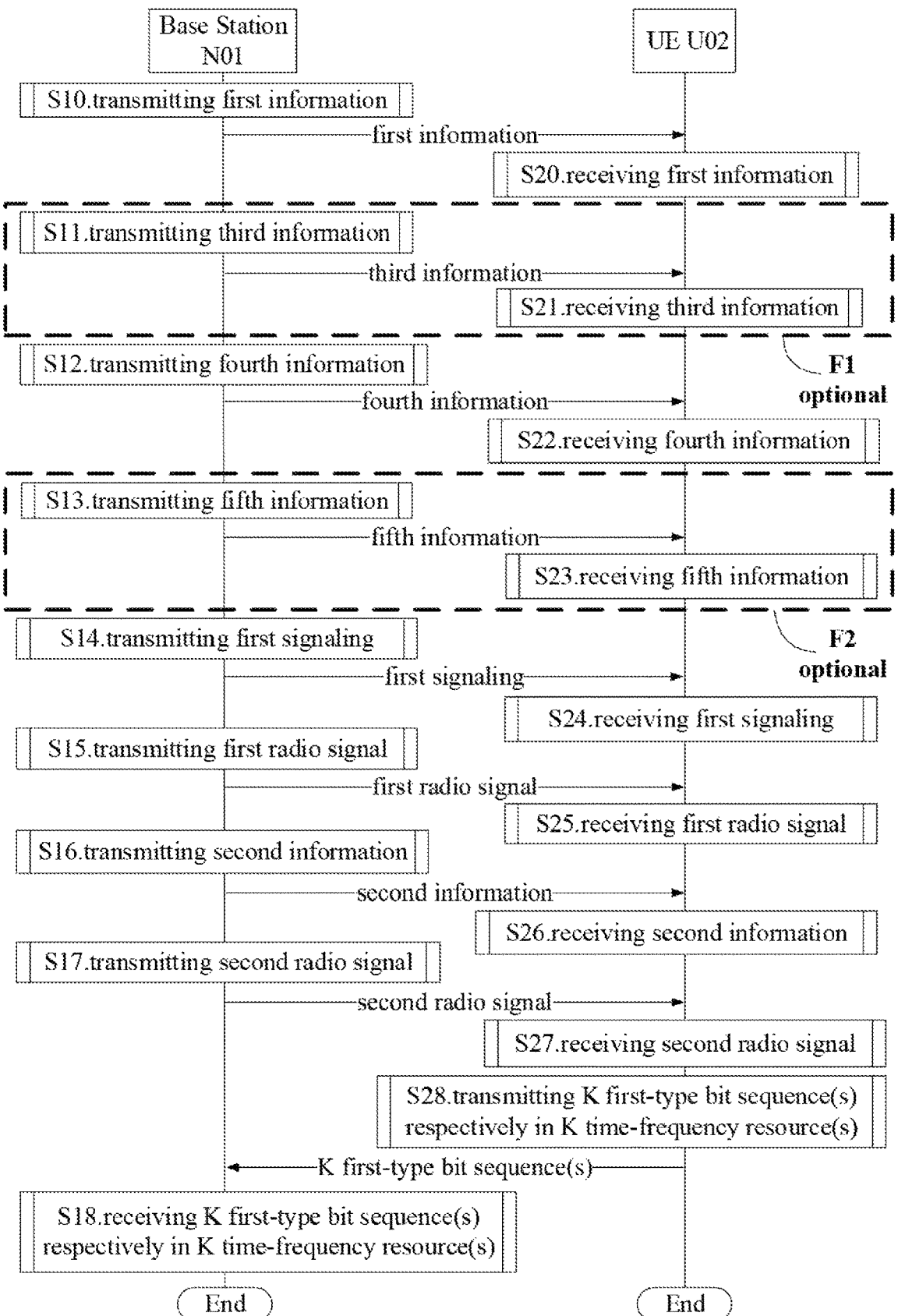
FIG. 5 illustrates a flowchart of wireless transmission according to one embodiment of the present disclosure.

Embodiment 5 illustrates a flowchart of wireless transmission, as shown in FIG. 5. In FIG. 5, a base station N01 is a maintenance base station for a serving cell of a UE U02. In FIG. 5, steps in box F1 and box F2 are optional, respectively.

The N01 transmits first information in step S10; transmits third information in step S11; transmits fourth information in step S12; transmits fifth information in step S13; transmits a first signaling in step S14; transmits a first radio signal in step S15; transmits second information in step S16; transmits a second radio signal in step S17; and receives K first-type bit sequence(s) respectively in K time-frequency resource(s) in step S18.

The U02 receives first information in step S20; receives third information in step S21; receives fourth information in step S22; receives fifth information in step S23; receives a first signaling in step S24; receives a first radio signal in step S25; receives second information in step S26; receives a second radio signal in step S27; and transmits K first-type bit sequence(s) respectively in K time-frequency resource(s) in step S28.

In Embodiment 5, a first bit block is used for indicating whether the first radio signal is correctly received, the first bit block comprises a positive integer number of bit(s); a second bit block comprises feedback to the second radio signal, the second bit block comprises a positive integer number of bit(s); each first-type bit sequence of the K first-type bit sequence(s) comprises a positive integer number of bit(s); the first bit block and the second bit block are used for generating each first-type bit sequence of the K first-type bit sequence(s); K is a positive integer. The first information is used for indicating a first identifier, the first signaling is used by the U02 for determining the K time-frequency resource(s); the first signaling is also used for indicating an MCS employed by the first radio signal out of a first target MCS set, the first target MCS set is an alternative MCS set of X alternative MCS sets, X is a positive integer greater than 1; the first signaling carries the first identifier, the first identifier is used for determining the first target MCS set out of the X alternative MCS sets. The second information is used by the U02 for determining time-frequency resources occupied by the second radio signal; the feedback to the second radio signal is used for indicating whether the second radio signal is correctly received, or the feedback to the second radio signal comprises CSI generated after a measurement on the second radio signal. The third information is used for indicating a second identifier, the second identifier is different from the first identifier, the second identifier is used for determining a second target MCS set out of the X alternative MCS sets, the second target MCS set and the first target MCS set are different. The fourth information is used for indicating N time-frequency resource sets; the first signaling is used for determining the K time-frequency resource(s) out of a first time-frequency resource set, the first time-frequency resource set is one of the N time-frequency resource sets.

In one embodiment, the first bit block comprises P bit sub-blocks, any two of the P bit sub-blocks are the same, the P is a positive integer greater than 1; the fifth information is used by the U02 for determining P, any bit sub-block of the P bit sub-blocks can be used for indicating whether the first radio signal is correctly received.

In one embodiment, the first information is semi-statically configured.

In one embodiment, the first information is carried by a higher layer signaling.

In one embodiment, the first information is carried by an RRC signaling.

In one embodiment, the first information is carried by a Medium Access Control (MAC) Control Element (CE) signaling.

In one embodiment, the first information comprises one or more Information Elements (IE) of an RRC signaling.

In one embodiment, the first information belongs to one IE of an RRC signaling.

In one embodiment, the first information comprises all or part of an IE of an RRC signaling.

In one embodiment, the first information comprises multiple IEs of an RRC signaling.

In one embodiment, the first information explicitly indicates the first identifier.

In one embodiment, the first information implicitly indicates the first identifier.

In one embodiment, the first identifier is a signaling identifier.

In one embodiment, the first identifier is an RNTI.

In one embodiment, the first identifier includes new-RNTI, wherein the specific meaning of the new-RNTI can be found in 3GPP TS38.214, Section 5.1.3.1.

In one embodiment, the first identifier includes one of multiple types of RNTI.

In one sub-embodiment of the above embodiment, the multiple types of RNTI include at least two of C-RNTI, CS-RNTI and new-RNTI, wherein the specific meaning of the new-RNTI can be found in 3GPP TS38.214, Section 5.1.3.1.

In one sub-embodiment of the above embodiment, the multiple types of RNTI include new-RNTI, and at least one of C-RNTI or CS-RNTI, wherein the specific meaning of the new-RNTI can be found in 3GPP TS38.214, Section 5.1.3.1.

In one embodiment, the first identifier is a non-negative integer.

In one embodiment, the second identifier is a non-negative integer.

In one embodiment, the first identifier and the second identifier are different signaling identifiers, respectively.

In one embodiment, the first identifier and the second identifier are different RNTIs respectively.

In one embodiment, the second identifier includes Cell-radio Network Temporary Identifier (C-RNTI) or Configured Scheduling-RNTI (CS-RNTI), while the first identifier includes new-RNTI, wherein the specific meaning of the new-RNTI can be found in 3GPP TS38.214, Section 5.1.3.1.

In one embodiment, the first identifier includes one of multiple types of RNTI, while the second identifier includes the other one of the multiple types of RNTI.

In one sub-embodiment of the above embodiment, the multiple types of RNTI include at least two of C-RNTI, CS-RNTI and new-RNTI, wherein the specific meaning of the new-RNTI can be found in 3GPP TS38.214, Section 5.1.3.1.

In one sub-embodiment of the above embodiment, the multiple types of RNTI include new-RNTI and at least one of C-RNTI or CS-RNTI, wherein the specific meaning of the new-RNTI can be found in 3GPP TS38.214, Section 5.1.3.1.

In one embodiment, the first identifier and the second identifier are different non-negative integers.

In one embodiment, the first signaling is dynamically configured.

In one embodiment, the first signaling is a physical layer signaling.

In one embodiment, the first signaling is a DCI signaling.

In one embodiment, the first signaling is a DCI signaling with DownLink Grant.

In one embodiment, the first signaling is transmitted on a downlink physical layer control channel (i.e., a downlink channel only capable of carrying a physical layer signaling).

In one sub-embodiment of the above embodiment, the downlink physical layer control channel is a Physical Downlink Control CHannel (PDCCH).

In one sub-embodiment of the above embodiment, the downlink physical layer control channel is a short PDCCH (sPDCCH).

In one sub-embodiment of the above embodiment, the downlink physical layer control channel is a New Radio PDCCH (NR-PDCCH).

In one sub-embodiment of the above embodiment, the downlink physical layer control channel is a Narrow Band PDCCH (NB-PDCCH).

In one embodiment, the first signaling is DCI format 1_0 or DCI format 1_1, the specific meaning of the DCI format 1_0 and the DCI format 1_1 can be found in 3GPP TS38.212, Section 7.3.1.2.

In one embodiment, the first signaling is DCI format 1_0, the specific meaning of the DCI format 1_0 can be found in 3GPP TS38.212, Section 7.3.1.2.

In one embodiment, the first signaling is DCI format 1_1, the specific meaning of the DCI format 1_1 can be found in 3GPP TS38.212, Section 7.3.1.2.

In one embodiment, the first signaling carries the first identifier.

In one sub-embodiment of the above embodiment, the first identifier is a signaling identifier for the first signaling.

In one sub-embodiment of the above embodiment, the first signaling is a DCI signaling identified by the first identifier.

In one sub-embodiment of the above embodiment, the first identifier is used for generating a Reference Signal (RS) sequence of DMRS of the first signaling.

In one sub-embodiment of the above embodiment, CRC bit sequence of the first signaling is scrambled by the first identifier.

In one embodiment, X is equal to 2.

In one embodiment, X is greater than 2.

In one embodiment, the X alternative MCS sets are pre-defined.

In one embodiment, there are two MCS sets in the X alternative MCS sets that have different target BLERs.

In one embodiment, there are two MCS sets in the X alternative MCS sets of which a minimum target code rate of MCSs comprised in one MCS set is different from that of MCSs comprised in the other MCS set.

In one embodiment, the first target MCS set is one of the X alternative MCS sets that corresponds to the first identifier.

In one embodiment, the second radio signal comprises data, or the second radio signal comprises data and DMRS.

In one sub-embodiment of the above embodiment, the data comprised in the second radio signal is downlink data.

In one sub-embodiment of the above embodiment, the second information is dynamically configured.

In one sub-embodiment of the above embodiment, the second information is DCI.

In one sub-embodiment of the above embodiment, the second information comprises a positive integer number of field(s) of one piece of DCI, wherein the field(s) comprises (comprise) a positive integer number of bit(s).

In one embodiment, the second radio signal comprises a reference signal.

In one sub-embodiment of the above embodiment, the reference signal comprised in the second radio signal comprises CSI-RS.

In one sub-embodiment of the above embodiment, the reference signal comprised in the second radio signal comprises CSI-RS and CSI-IMR.

In one sub-embodiment of the above embodiment, the second information is semi-statically configured.

In one sub-embodiment of the above embodiment, the second information is carried by a higher layer signaling.

In one sub-embodiment of the above embodiment, the second information is carried by an RRC signaling.

In one sub-embodiment of the above embodiment, the second information comprises one or more IEs of an RRC signaling.

In one sub-embodiment of the above embodiment, the second information comprises all or part of an IE of an RRC signaling.

In one sub-embodiment of the above embodiment, the second information comprises multiple IEs of an RRC signaling.

In one sub-embodiment of the above embodiment, the second information is dynamically configured.

In one sub-embodiment of the above embodiment, the second information is DCI.

In one sub-embodiment of the above embodiment, the second information comprises a positive integer number of field(s) of one piece of DCI, wherein the field(s) comprises (comprise) a positive integer number of bit(s).

In one embodiment, a transmission channel for the second radio signal is a DL-SCH.

In one embodiment, the second radio signal is transmitted on a downlink physical layer data channel (i.e., a downlink channel capable of carrying physical layer data).

In one sub-embodiment of the above embodiment, the downlink physical layer data channel is a PDSCH.

In one sub-embodiment of the above embodiment, the downlink physical layer data channel is an sPDSCH.

In one sub-embodiment of the above embodiment, the downlink physical layer data channel is an NR-PDSCH.

In one sub-embodiment of the above embodiment, the downlink physical layer data channel is an NB-PDSCH In one embodiment, the second information is semi-statically configured.

In one embodiment, the second information is carried by a higher layer signaling.

In one embodiment, the second information is carried by an RRC signaling.

In one embodiment, the second information is carried by a MAC CE signaling.

In one embodiment, the second information comprises one or more IEs of an RRC signaling.

In one embodiment, the second information comprises all or part of an IE of an RRC signaling.

In one embodiment, the second information comprises multiple IEs of an RRC signaling.

In one embodiment, the second information is dynamically configured.

In one embodiment, the second information is carried by a physical layer signaling.

In one embodiment, the second information is DCI.

In one embodiment, the second information comprises a positive integer number of field(s) of one piece of DCI, wherein the field(s) comprises(comprise) a positive integer number of bit(s).

In one embodiment, the feedback to the second radio signal is used for indicating whether the second radio signal is correctly received.

In one sub-embodiment of the above embodiment, the feedback to the second radio signal explicitly indicates whether the second radio signal is correctly received.

In one sub-embodiment of the above embodiment, the feedback to the second radio signal implicitly indicates whether the second radio signal is correctly received.

In one sub-embodiment of the above embodiment, the feedback to the second radio signal comprises HARQ-ACK feedback to the second radio signal.

In one sub-embodiment of the above embodiment, the second radio signal comprises data, or the second radio signal comprises data and DMRS.

In one embodiment, the feedback to the second radio signal comprises CSI generated after a measurement on the second radio signal.

In one sub-embodiment of the above embodiment, the second radio signal comprises a reference signal.

In one sub-embodiment of the above embodiment, the second radio signal comprises CSI-RS.

In one sub-embodiment of the above embodiment, the second radio signal comprises CSI-RS and CSI-IMR.

In one sub-embodiment of the above embodiment, the CSI comprises at least one of Rank indication (RI), a Precoding matrix indicator (PMI), a Channel quality indicator (CQI) or a Csi-reference signal Resource Indicator (CRI).

In one sub-embodiment of the above embodiment, the measurement on the second radio signal comprises a channel measurement, wherein the channel measurement is used for generating the CSI.

In one sub-embodiment of the above embodiment, the measurement on the second radio signal comprises an interference measurement, wherein the interference measurement is used for generating the CSI.

In one sub-embodiment of the above embodiment, the measurement on the second radio signal comprises a channel measurement and an interference measurement, wherein the channel measurement and the interference measurement is used for generating the CSI.

In one embodiment, the feedback to the second radio signal is used for indicating whether the second radio signal is correctly received; the third information is used for indicating a second identifier, the second identifier is different from the first identifier, the second identifier is used for determining a second target MCS set out of the X alternative MCS sets, the second target MCS set and the first target MCS set are different; a second signaling carries the second information, the second signaling carries the second identifier, the second signaling is also used for indicating an MCS employed by the second radio signal out of the second target MCS set, a minimum target code rate of MCSs comprised in the second target MCS set is greater than a minimum target code rate of MCSs comprised in the first target MCS set.

In one embodiment, the feedback to the second radio signal comprises CSI generated after the measurement on the second radio signal, a second signaling carries the second information, the second signaling carries the first identifier.

In one sub-embodiment of the above embodiment, the second signaling is a physical layer signaling.

In one sub-embodiment of the above embodiment, the second signaling is a DCI signaling.

In one sub-embodiment of the above embodiment, the first identifier is a signaling identifier for the second signaling.

In one sub-embodiment of the above embodiment, the second signaling is a DCI signaling identifier by the first identifier.

In one sub-embodiment of the above embodiment, the first identifier is used for generating an RS sequence of DMRS of the second signaling.

In one sub-embodiment of the above embodiment, CRC bit sequence of the second signaling is scrambled by the first identifier.

In one embodiment, the feedback to the second radio signal comprises CSI generated after a measurement on the second radio signal, a second signaling carries the second information, the second signaling also carries the second identifier.

In one sub-embodiment of the above embodiment, the second signaling is a physical layer signaling.

In one sub-embodiment of the above embodiment, the second signaling is a DCI signaling.

In one sub-embodiment of the above embodiment, the second identifier is a signaling identifier for the second signaling.

In one sub-embodiment of the above embodiment, the second signaling is a DCI signaling identified by the second identifier.

In one sub-embodiment of the above embodiment, the second identifier is used for generating an RS sequence of DMRS of the second signaling.

In one sub-embodiment of the above embodiment, CRC bit sequence of the second signaling is scrambled by the second identifier.

In one embodiment, the above method also comprises:
receiving sixth information;
herein, the feedback to the second radio signal comprises CSI generated after a measurement on the second radio signal, the CSI generated after the measurement on the second radio signal comprises a first channel quality indicator, the first channel quality indicator is used for indicating a first channel quality out of a target channel quality set, the measurement on the second radio signal is used for generating the first channel quality, the target channel quality set is an alternative channel quality set of Y alternative channel quality sets, Y is a positive integer greater than 1; the sixth information is used for determining the target channel quality set out of the Y alternative channel quality sets.

In one sub-embodiment of the above embodiment, a first channel quality indicator is called CQI.

In one sub-embodiment of the above embodiment, a transport block error rate corresponding to the target channel quality set is no greater than 0.1.

In one sub-embodiment of the above embodiment, a transport block error rate corresponding to the target channel quality set is no greater than 0.00001.

In one sub-embodiment of the above embodiment, a transport block error rate corresponding to the target channel quality set is no greater than 0.000001.

In one sub-embodiment of the above embodiment, the sixth information is cqi-Table. The specific meaning of the cqi-Table can be found in 3GPP TS38.214, Section 5.2.2.1.

In one sub-embodiment of the above embodiment, the sixth information is semi-statically configured.

In one sub-embodiment of the above embodiment, the sixth information is carried by a higher layer signaling.

In one sub-embodiment of the above embodiment, the sixth information is carried by an RRC signaling.

In one sub-embodiment of the above embodiment, the sixth information is carried by a MAC CE signaling.

In one sub-embodiment of the above embodiment, the sixth information comprises one or more IEs of an RRC signaling.

In one sub-embodiment of the above embodiment, the sixth information belongs to an IE of an RRC signaling.

In one sub-embodiment of the above embodiment, the sixth information comprises all or part of an IE of an RRC signaling.

In one sub-embodiment of the above embodiment, the sixth information comprises multiple IEs of an RRC signaling.

In one embodiment, the third information is semi-statically configured.

In one embodiment, the third information is carried by a higher layer signaling.

In one embodiment, the third information is carried by an RRC signaling.

In one embodiment, the third information is carried by a MAC CE signaling.

In one embodiment, the third information comprises one or more IEs of an RRC signaling.

In one embodiment, the third information comprises one IE of an RRC signaling.

In one embodiment, the third information comprises all or part of an IE of an RRC signaling.

In one embodiment, the third information comprises multiple IEs of an RRC signaling.

In one embodiment, the third information explicitly indicates the second identifier.

In one embodiment, the third information implicitly indicates the second identifier.

In one embodiment, the feedback to the second radio signal is used for indicating whether the second radio signal is correctly received, a second signaling carries the second information, and the second signaling also carries the second identifier.

In one sub-embodiment of the above embodiment, the second identifier is a signaling identifier for the second signaling.

In one sub-embodiment of the above embodiment, the second signaling is a DCI signaling identified by the second identifier.

In one sub-embodiment of the above embodiment, the second identifier is used for generating an RS sequence of DMRS of the second signaling.

In one sub-embodiment of the above embodiment, CRC bit sequence of the second signaling is scrambled by the second identifier.

In one embodiment, the second target MCS set is an MCS set of the X alternative MCS sets that corresponds to the second identifier.

In one embodiment, the second target MCS set is composed of a positive integer number of MCS(s).

In one embodiment, a target BLER of the first target MCS set is smaller than that of the second MCS set.

In one sub-embodiment of the above embodiment, the target BLER of the second MCS set is equal to 0.1.

In one sub-embodiment of the above embodiment, the target BLER of the first target MCS set is less than 0.1.

In one sub-embodiment of the above embodiment, the target BLER of the first target MCS set is equal to 0.00001.

In one sub-embodiment of the above embodiment, the target BLER of the first target MCS set is equal to 0.000001.

In one embodiment, the fourth information is semi-statically configured.

In one embodiment, the fourth information is carried by a higher layer signaling.

In one embodiment, the fourth information is carried by an RRC signaling.

In one embodiment, the fourth information is carried by a MAC CE signaling.

In one embodiment, the fourth information comprises one or more IEs of an RRC signaling.

In one embodiment, the fourth information comprises all or part of an IE of an RRC signaling.

In one embodiment, the fourth information comprises multiple IEs of an RRC signaling.

In one embodiment, the fourth information explicitly indicates N time-frequency resource sets.

In one embodiment, the fourth information implicitly indicates N time-frequency resource sets.

In one embodiment, the fourth information indicates configuration information of each of the N time-frequency resource sets.

In one embodiment, each of the N time-frequency resource sets comprises a positive integer number of time-frequency resource(s), the fourth information comprises configuration information of each of the N time-frequency resource sets.

In one embodiment, a given time-frequency resource set is one of the N time-frequency resource sets, the given time-frequency resource set comprises a positive integer number of time-frequency resource(s); a given time-frequency resource is a time-frequency resource in the given time-frequency resource set.

In one sub-embodiment of the above embodiment, the configuration information of the given time-frequency resource comprises at least one of occupied time domain resource, occupied code domain resource, occupied frequency resource and a corresponding antenna port set.

In one sub-embodiment of the above embodiment, the configuration information of the given time-frequency resource comprises occupied time domain resource, occupied code domain resource, occupied frequency resource and a corresponding antenna port set.

In one sub-embodiment of the above embodiment, the configuration information of the given time-frequency resource comprises occupied initial multicarrier symbols, a number of occupied multicarrier symbols, initial Physical Resource Blocks (PRBs) before or without frequency hopping, initial PRBs after frequency hopping, a number occupied PRBs, setting of frequency hopping, Cyclic Shift (CS), an Orthogonal Cover Code (OCC), OCC length, a corresponding antenna port set and a maximum code rate.

In one sub-embodiment of the above embodiment, the configuration information of the given time-frequency resource comprises at least one of occupied initial multicarrier symbols, a number of occupied multicarrier symbols, initial PRBs before or without frequency hopping, initial PRBs after frequency hopping, a number occupied PRBs, setting of frequency hopping, CS, an OCC, OCC length, a corresponding antenna port set or a maximum code rate.

In one embodiment, the N time-frequency resource sets are N PUCCH resource sets respectively. The specific meaning of the N PUCCH resource sets can be found in 3GPP TS38.213, Section 9.2.1.

In one embodiment, the N time-frequency resource sets respectively correspond to N payload ranges.

In one embodiment, the N time-frequency resource sets respectively correspond to N bit number ranges.

In one embodiment, the fifth information is semi-statically configured.

In one embodiment, the fifth information is carried by a higher layer signaling.

In one embodiment, the fifth information is carried by an RRC signaling.

In one embodiment, the fifth information is carried by a MAC CE signaling.

In one embodiment, the fifth information comprises one or more IEs of an RRC signaling.

In one embodiment, the fifth information comprises all or part of an IE of an RRC signaling.

In one embodiment, the fifth information comprises multiple IEs of an RRC signaling.

In one embodiment, the fifth information is DCI.

In one embodiment, the fifth information comprises a field of one piece of DCI, wherein the field comprises a positive integer number of bit(s).

In one embodiment, the fifth information is composed of multiple fields of one piece of DCI, wherein each field comprises a positive integer number of bit(s).

In one embodiment, the fifth information is carried by the first signaling.

In one sub-embodiment of the above embodiment, the first signaling comprises a fourth field, wherein the fourth field comprised in the first signaling comprises the fifth information.

In one sub-embodiment of the above embodiment, the first field comprised in the first signaling comprises the fifth information.

In one embodiment, the fifth information is used for indicating P.

In one sub-embodiment of the above embodiment, the fifth information explicitly indicates P.

In one sub-embodiment of the above embodiment, the fifth information implicitly indicates P.

In one sub-embodiment of the above embodiment, the fifth information comprises an index of P in a first value range, the first value range is a range of values of P.

In one embodiment, the fifth information is used for indicating K and P.

In one embodiment, the fifth information explicitly indicates K and P.

In one embodiment, the fifth information implicitly indicates K and P.

In one embodiment, a first value range is a range of values of P, a second value range is a range of values of K, any group of values in P1 groups of values comprises a first value and a second value, the first value is a value in the first value range, the second value is a value in the second value range, any two of the P1 groups of values are not completely the same; the fifth information is used for determining K and P out of the P1 groups of values.

In one sub-embodiment of the above embodiment, the fifth information is used for indicating a first group of values out of the P1 groups of values, two values of the first group of values are respectively P and K.

In one sub-embodiment of the above embodiment, the fifth information comprises a first index, the first index is a first group of values out of the P1 groups of values, wherein two values in the first group of values are P and K, respectively.

In one embodiment, K is pre-defined or configurable.

In one embodiment, K is pre-defined.

In one embodiment, K is configurable.

In one sub-embodiment of the above embodiment, the first signaling is used for indicating K.

In one sub-embodiment of the above embodiment, the first field comprised in the first signaling is used for indicating K.

In one sub-embodiment of the above embodiment, the third field comprised in the first signaling is used for indicating K.

In one sub-embodiment of the above embodiment, the fourth field comprised in the first signaling is used for indicating K.

In one sub-embodiment of the above embodiment, the fifth information is also used for indicating K.

In one embodiment, P is pre-defined or can be configured.

In one embodiment, P is pre-defined.

In one embodiment, P can be configured.

In one sub-embodiment of the above embodiment, the first signaling is also used for indicating P.

In one sub-embodiment of the above embodiment, the first field comprised in the first signaling is used for indicating P.

In one sub-embodiment of the above embodiment, the fourth field comprised in the first signaling is used for indicating P.

In one sub-embodiment of the above embodiment, the fifth information is used for indicating P.

In one embodiment, P is related to K.

In one sub-embodiment of the above embodiment, a first value range is a range of values of P, a second value range is a range of values of K, a given second value is a value in the second value range, a given first value subset is composed of a positive integer number of value(s) corresponding to the given second value among the first value range, a number of value(s) comprised by the given first value subset is less than a number of values comprised by the first value range.

In one sub-embodiment of the above embodiment, a first value range is a range of values of P, a second value range is a range of values of K, a given first value is a value in the first value range, a given second value subset is composed of a positive integer number of value(s) corresponding to the given first value among the second value range, a number of value(s) comprised by the given second value subset is less than a number of values comprised by the second value range.

In one embodiment, P is unrelated to K.

In one sub-embodiment of the above embodiment, P and K are separately determined.

In one sub-embodiment of the above embodiment, P and K are respectively configured.

Embodiment 6

Figure 6:
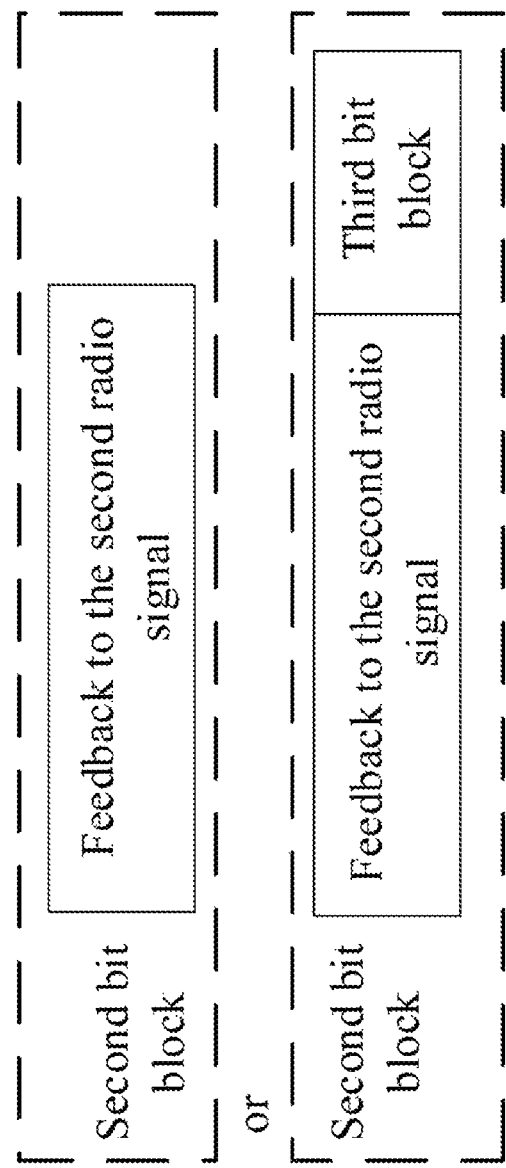
FIG. 6 illustrates a schematic diagram of a second bit block according to one embodiment of the present disclosure.

Embodiment 6 illustrates a schematic diagram of a second bit block, as shown in FIG. 6.

In Embodiment 6, the second bit block comprises the feedback to the second radio signal in the present disclosure, the second bit block comprises a positive integer number of bit(s).

In one embodiment, the second bit block is composed of all bit(s) in the feedback to the second radio signal.

In one sub-embodiment of the above embodiment, a number of bit(s) comprised in the second bit block is equal to a number of the bit(s) in the feedback to the second radio signal.

In one embodiment, the second bit block comprises the feedback to the second radio signal and a third bit block, the third bit block comprises t bit(s); t is a positive integer.

In one sub-embodiment of the above embodiment, each of the t bit(s) is pre-defined or can be configured.

In one sub-embodiment of the above embodiment, each of the t bit(s) is pre-defined.

In one sub-embodiment of the above embodiment, each of the t bit(s) is configurable.

In one sub-embodiment of the above embodiment, each of the t bit(s) is 0.

In one sub-embodiment of the above embodiment, each of the t bit(s) is 1.

In one sub-embodiment of the above embodiment, each of the t bit(s) is a padding bit.

In one sub-embodiment of the above embodiment, the third bit block is composed of t bit(s) in the feedback to the second radio signal.

In one sub-embodiment of the above embodiment, the third bit block is composed oft continuous bits in the feedback to the second radio signal.

In one sub-embodiment of the above embodiment, a number of bits comprised in the second bit block is greater than a number of bit(s) in the feedback to the second radio signal.

Embodiment 7

Figure 7:
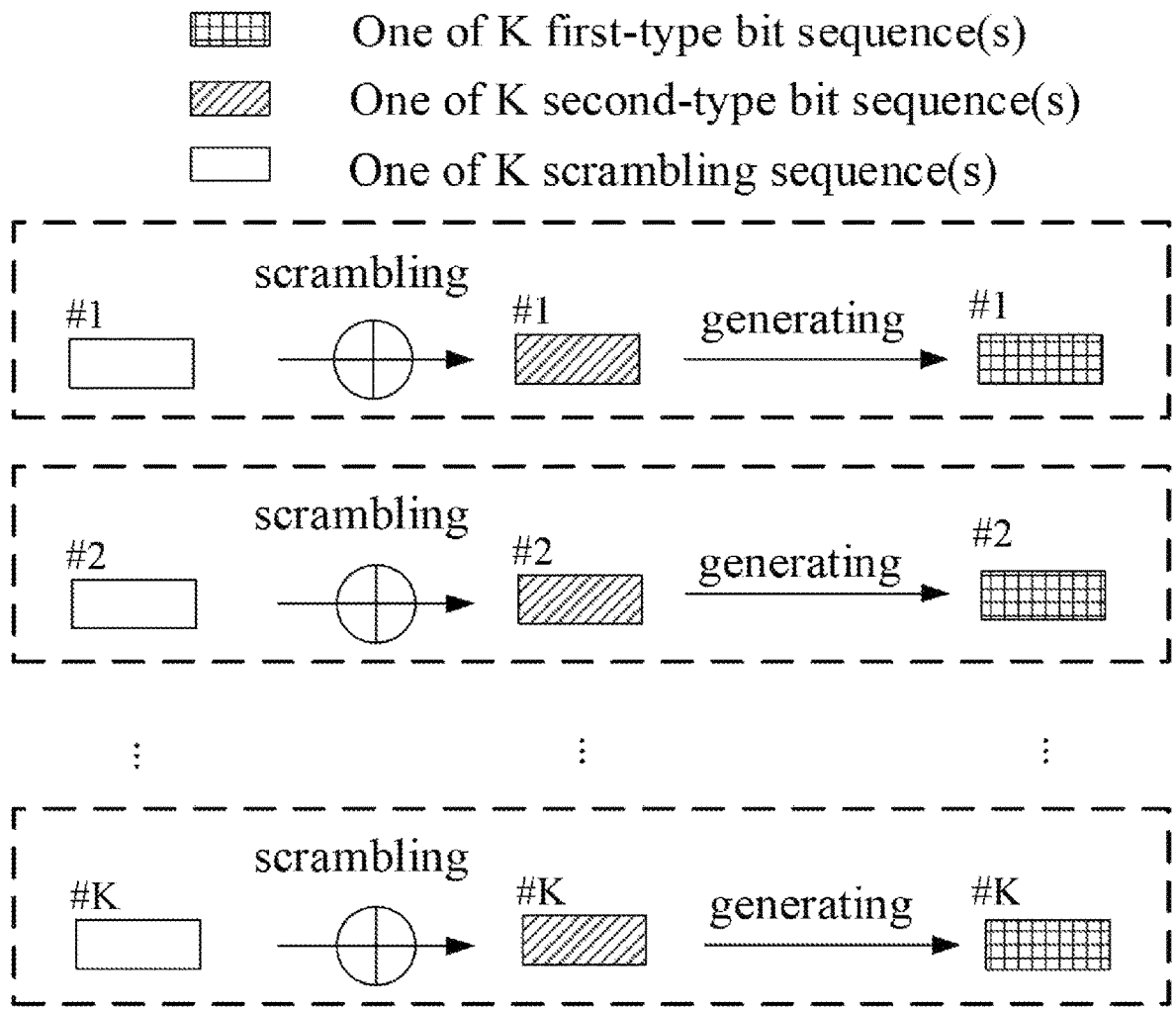
FIG. 7 illustrates a schematic diagram of relations between K first-type bit sequence(s) and K second-type bit sequence(s) according to one embodiment of the present disclosure.

Embodiment 7 illustrates a schematic diagram of relations between K first-type bit sequence(s) and K second-type bit sequence(s), as shown in FIG. 7.

In Embodiment 7, the K first-type bit sequence(s) is(are) respectively generated by scrambling of K second-type bit sequence(s) and K scrambling sequence(s) correspondingly, the first bit block and the second bit block of the present disclosure are used for generating each of the K second-type bit sequence(s), the K scrambling sequence(s) is(are) separately generated after a scrambling sequence generator is initialized by K initial value(s) respectively.

In one embodiment, K is greater than 1.

In one embodiment, K is equal to 1.

In one embodiment, K is greater than 1, any two of the K second-type bit sequences comprise equal numbers of bits.

In one embodiment, K is greater than 1, there are two second-type bit sequences in the K second-type bit sequences that comprise different numbers of bits.

In one embodiment, K is greater than 1, at least two of the K second-type bit sequences comprise different numbers of bits.

In one embodiment, K is greater than 1, all of the K second-type bit sequences are the same.

In one embodiment, K is greater than 1, there are two second-type bit sequences in the K second-type bit sequences that are different.

In one embodiment, K is greater than 1, at least two of the K second-type bit sequences are different.

In one embodiment, a given first-type bit sequence is any first-type bit sequence of the K first-type bit sequences, the given first-type bit sequence is generated after a given second-type bit sequence is scrambled by a given scrambling sequence, the given second-type bit sequence is a second-type bit sequence of the K second-type bit sequences that corresponds to the given first-type bit sequence, the given scrambling sequence is one of the K scrambling sequences that corresponds to the given first-type bit sequence, the given first-type bit sequence, the given second-type bit sequence and the given scrambling sequence respectively comprise equal numbers of bits.

In one sub-embodiment of the above embodiment, a number of bits comprised in the given first-type bit sequence is equal to I, the I is a positive integer; an i-th bit in the given first-type bit sequence is equal to a value obtained after an i-th bit in the given second-type bit sequence and an i-th bit in the given scrambling sequence are subjected to exclusive OR (Xor) calculation; i=1, 2, . . . , I.

In one sub-embodiment of the above embodiment, a number of bits comprised in the given first-type bit sequence is equal to I, the I is a positive integer; an i-th bit in the given first-type bit sequence is equal to a value obtained after a sum of an i-th bit in the given second-type bit sequence and an i-th bit in the given scrambling sequence is subjected to mod 2; i=1, 2, . . . , I.

In one sub-embodiment of the above embodiment, the given first-type bit sequence is $d_1 d_2 \ldots d_I$, the given second-type bit sequence is $a_1 a_2 \ldots a_I$, and the given scrambling sequence is $c_1 c_2 \ldots c_I$; I is a number of bits comprised in the given first-type bit sequence, I is a positive integer; the i-th bit $d_i$ in the given first-type bit sequence is equal to a value obtained after a sum of the i-th bit $a_i$ in the given second-type bit sequence and the i-th bit $c_i$ in the given scrambling sequence is subjected to mod 2, namely, $d_i=(a_i+c_i)$mod 2, wherein i=1, 2, . . . , I.

In one embodiment, K is greater than 1, the K scrambling sequences are the same.

In one embodiment, K is greater than 1, there are two different scrambling sequences in the K scrambling sequences.

In one embodiment, K is greater than 1, at least two of the K scrambling sequences are different.

In one embodiment, K is greater than 1, any two initial values of the K initial values are equal.

In one embodiment, K is greater than 1, there are two initial values of the K initial values that are unequal.

In one embodiment, K is greater than 1, at least two of the K initial values are unequal.

In one embodiment, K is greater than 1, k1 initial values of the K initial values are mutually unequal, k1 is a positive integer greater than 1; k1 scrambling sequences of the K scrambling sequences corresponding to the k1 initial values are mutually unequal.

In one embodiment, K is greater than 1, k2 initial values of the K initial values are equal, k2 is a positive integer greater than 1; k2 scrambling sequences of the K scrambling sequences corresponding to the k2 initial values are the same.

In one embodiment, K is greater than 1, any two of the K initial values are equal, and the K scrambling sequences are the same.

In one embodiment, K is greater than 1, there are two unequal initial values in the K initial values, and there are two scrambling sequences in the K scrambling sequences that are different.

In one embodiment, K is greater than 1, at least two of the K initial values are unequal, and at least two of the K scrambling sequences are different.

In one embodiment, any initial value of the K initial value(s) is a non-negative integer.

In one embodiment, any initial value of the K initial value(s) is a binary non-negative integer with no more than 31 digits.

In one embodiment, any initial value of the K initial value(s) is $c_{init}$ in 3GPP TS38.211, Section 5.2.1.

In one embodiment, a first given scrambling sequence is any scrambling sequence of the K scrambling sequences, the first given initial value is one of the K initial values that corresponds to the first given scrambling sequence; the first given scrambling sequence is c(n) in 3GPP TS38.211, Section 5.2.1, and the first given initial value is $c_{init}$ in 3GPP TS38.211, Section 5.2.1, the generation of the first given scrambling sequence can be found in 3GPP TS38.211, Section 5.2.1.

Embodiment 8

Figure 8:
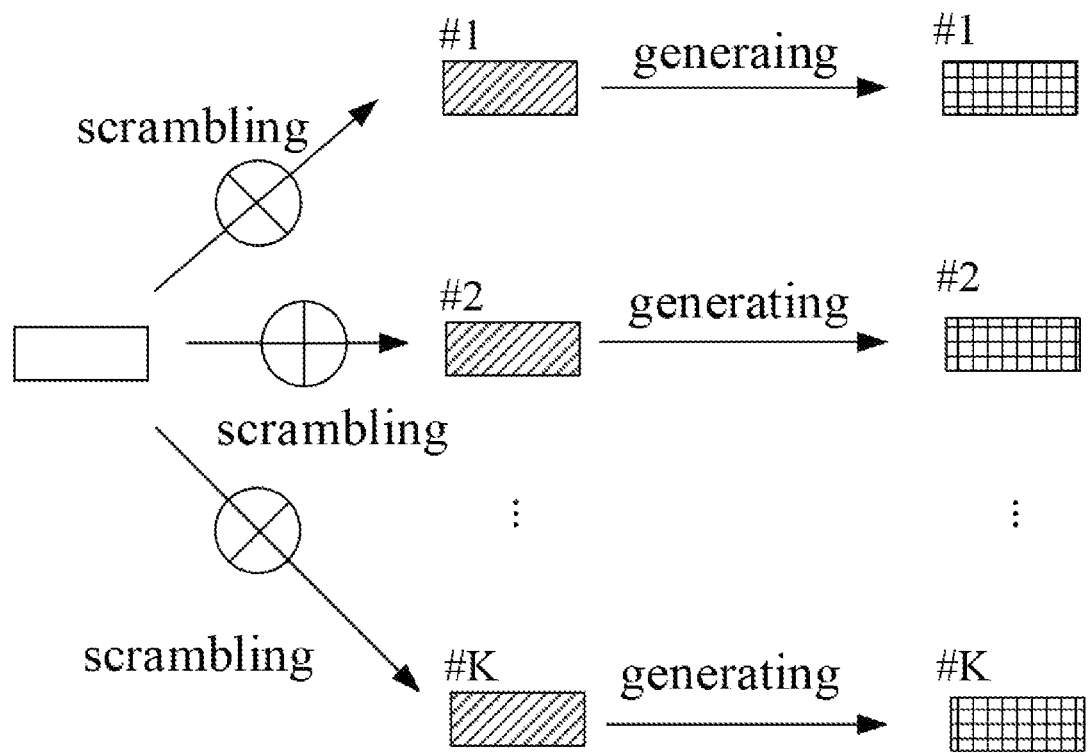
FIG. 8 illustrates a schematic diagram of relation(s) between K first-type bit sequence(s) and K second-type bit sequence(s) according to another embodiment of the present disclosure.

Embodiment 8 illustrates a schematic diagram of relation(s) between K first-type bit sequence(s) and K second-type bit sequence(s), as shown in FIG. 8.

In Embodiment 8, the K first-type bit sequence(s) is(are) respectively generated after the K second-type bit sequence(s) is(are) respectively scrambled by a first scrambling sequence, the first bit block and the second bit block in the present disclosure are used for generating each of the K second-type bit sequence(s), the first scrambling sequence is generated after a scrambling sequence generator is initialized by a first initial value.

In one embodiment, K is greater than 1.

In one embodiment, K is equal to 1.

In one embodiment, K is greater than 1, any of the K second-type bit sequences comprise equal numbers of bits.

In one embodiment, K is greater than 1, there are two second-type bit sequences in the K second-type bit sequences that comprise unequal numbers of bits.

In one embodiment, K is greater than 1, at leas two of the K second-type bit sequences comprise different numbers of bits.

In one embodiment, K is greater than 1, all of the K second-type bit sequences are the same.

In one embodiment, K is greater than 1, there are two different second-type bit sequences in the K second-type bit sequences.

In one embodiment, K is greater than 1, at least two of the K second-type bit sequences are different.

In one embodiment, a given first-type bit sequence is any first-type bit sequence of the K first-type bit sequence(s), the given first-type bit sequence is generated after a given second-type bit sequence is scrambled by the first scrambling sequence, the given second-type bit sequence is one of the K second-type bit sequence(s) that corresponds to the given first-type bit sequence, the given first-type bit sequence, the given second-type bit sequence and the first scrambling sequence respectively comprise equal numbers of bits.

In one sub-embodiment of the above embodiment, a number of bits comprised in the given first-type bit sequence is equal to I, the I is a positive integer; an i-th bit in the given first-type bit sequence is equal to a value obtained after an i-th bit in the given second-type bit sequence and an i-th bit in the first scrambling sequence are subjected to exclusive OR (Xor) calculation; i=1, 2, . . . , I.

In one sub-embodiment of the above embodiment, a number of bits comprised in the given first-type bit sequence is equal to I, the I is a positive integer; an i-th bit in the given first-type bit sequence is equal to a value obtained after a sum of an i-th bit in the given second-type bit sequence and an i-th bit in the first scrambling sequence is subjected to mod 2; i=1, 2, . . . , I.

In one sub-embodiment of the above embodiment, the given first-type bit sequence is $d_1 d_2 \ldots d_I$, the given second-type bit sequence is $a_1 a_2 \ldots a_I$, and the given scrambling sequence is $c_1 c_2 \ldots c_I$; I is a number of bits comprised in the given first-type bit sequence, I is a positive integer; the i-th bit $d_i$ in the given first-type bit sequence is equal to a value obtained after a sum of the i-th bit $a_i$ in the given second-type bit sequence and the i-th bit $c_i$ in the first scrambling sequence is subjected to mod 2, namely, $d_i=(a_i+c_i)$mod 2, wherein i=1, 2, . . . , I.

In one embodiment, the first initial value is a non-negative integer.

In one embodiment, the first initial value is a binary non-negative integer with no more than 31 digits.

In one embodiment, the first initial value is $c_{init}$ in 3GPP TS38.211, Section 5.2.1.

In one embodiment, the first scrambling sequence is c(n) in 3GPP TS38.211, Section 5.2.1, and the first initial value is $c_{init}$ in 3GPP TS38.211, Section 5.2.1, the generation of the first scrambling sequence can be found in 3GPP TS38.211, Section 5.2.1.

Embodiment 9

Figure 9:
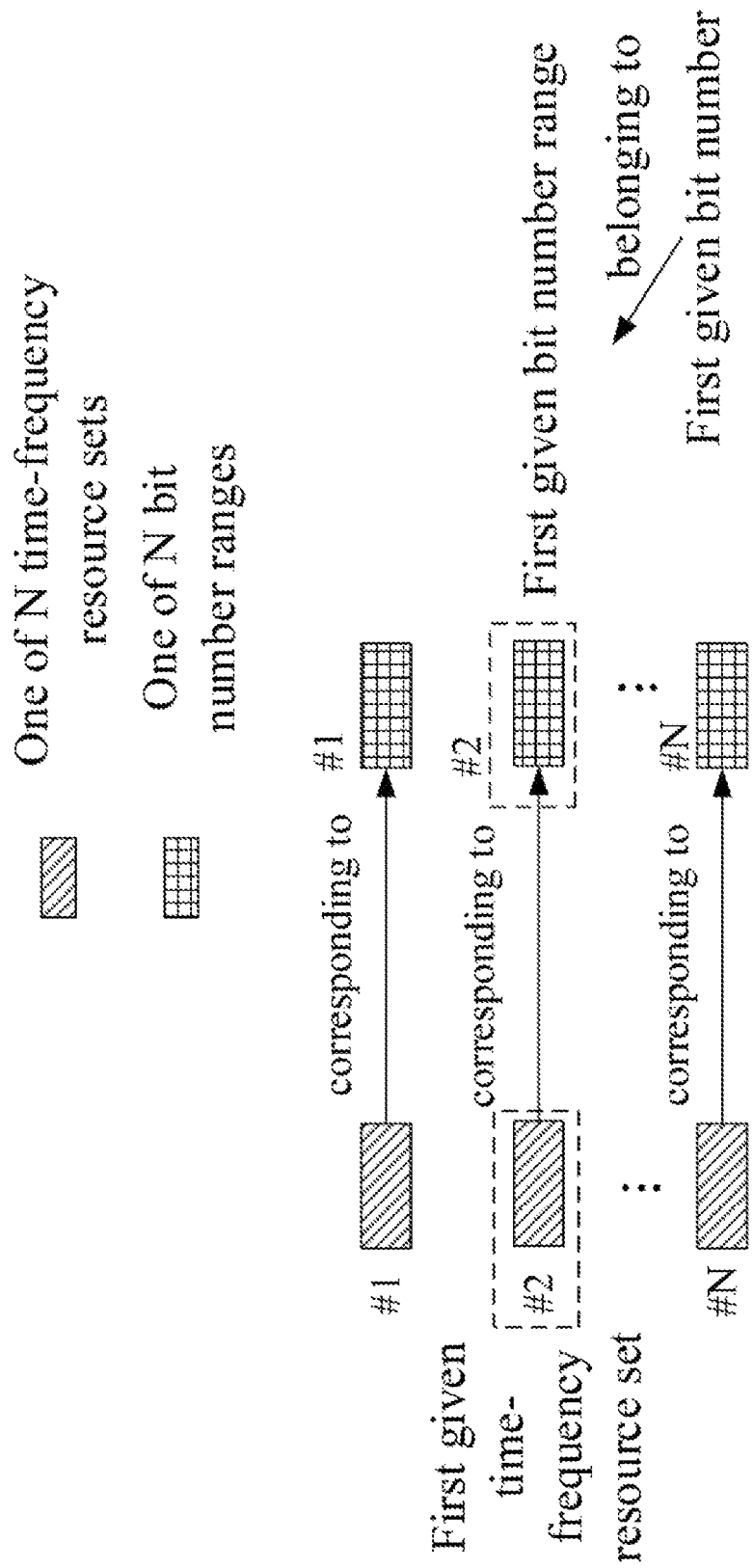
FIG. 9 illustrates a schematic diagram of a first given bit number being used for determining a first given time-frequency resource set out of N time-frequency resource sets according to one embodiment of the above embodiment.

Embodiment 9 illustrates a schematic diagram of a first given bit number being used for determining a first given time-frequency resource set out of N time-frequency resource sets, as shown in FIG. 9.

In Embodiment 9, the N time-frequency resource sets respectively correspond to N bit number ranges, a first given bit number belongs to a first given bit number range, the first given bit number range is one of the N bit number ranges, the first given time-frequency resource set is one of the N time-frequency resource sets that corresponds to the first given bit number range; the N is a positive integer greater than 1. The first given time-frequency resource set corresponds to the first time-frequency resource set in the present disclosure, and the first given bit number corresponds to a number of bits comprised in one of the K target bit sub-blocks in the present disclosure; or, the first given time-frequency resource set corresponds to the first time-frequency resource set in the present disclosure, and the first given bit number corresponds to a number of bits comprised in the third bit block in the present disclosure.

In one embodiment, the N time-frequency resource sets are respectively N PUCCH resource sets, the specific meaning of the PUCCH resource sets can be found in 3GPP TS38.213, Section 9.2.1.

In one embodiment, there does not exist a bit number belonging to any two bit number ranges of the N bit number ranges at the same time.

In one embodiment, N is equal to 4, the N bit number ranges are [1, 2], (2, N2], (N2, N3] and (N3,1706], respectively, N2 and N3 are configured by a higher layer signaling.

In one embodiment, N is equal to 4, the N bit number ranges are [1, 2], (2, N2], (N2, N3] and (N3,1706], respectively, N2 and N3 are pre-defined.

Embodiment 10

Figure 10:
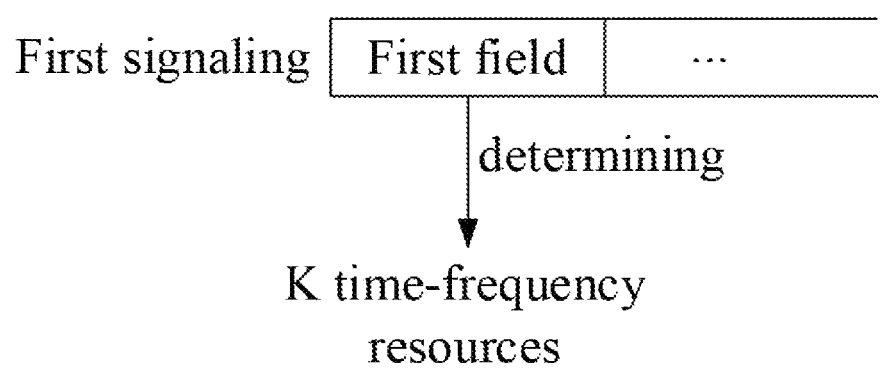
FIG. 10 illustrates a schematic diagram of a first signaling according to one embodiment of the present disclosure.

Embodiment 10 illustrates a schematic diagram of a first signaling, as shown in FIG. 10.

In Embodiment 10, the first signaling comprises a first field, the first field comprised in the first signaling is used for determining the K time-frequency resource(s).

In one embodiment, the first field comprised in the first signaling comprises a positive integer number of bit(s).

In one embodiment, the first field comprised in the first signaling is used for determining the K time-frequency resource(s) out of a first time-frequency resource set, the first time-frequency resource set comprises a positive integer number of time-frequency resource(s).

In one embodiment, the first field comprised in the first signaling is used for indicating K and determining the K time-frequency resource(s) out of a first time-frequency resource set, the first time-frequency resource set comprises a positive integer number of time-frequency resource(s).

In one embodiment, the first field comprised in the first signaling is used for indicating the fifth information in the present disclosure and determining the K time-frequency resource(s) out of a first time-frequency resource set, the first time-frequency resource set comprises a positive integer number of time-frequency resource(s), and the fifth information is used for indicating K and P.

In one embodiment, the first field comprised in the first signaling indicates an index(indices) of the K time-frequency resource(s) in a first time-frequency resource set, the first time-frequency resource set comprises a positive integer number of time-frequency resource(s).

In one embodiment, the first field comprised in the first signaling indicates an index of an earliest time-frequency of the K time-frequency resources in a first time-frequency resource set, the first time-frequency resource set comprises a positive integer number of time-frequency resources.

In one embodiment, the first field comprised in the first signaling indicates K and an index of an earliest time-frequency of the K time-frequency resources in a first time-frequency resource set, the first time-frequency resource set comprises a positive integer number of time-frequency resources.

In one embodiment, the first field comprised in the first signaling the fifth information in the present disclosure and an index of an earliest time-frequency of the K time-frequency resources in a first time-frequency resource set, the first time-frequency resource set comprises a positive integer number of time-frequency resources, and the fifth information is used for indicating K and P.

In one embodiment, the first field comprised in the first signaling is a PUCCH resource indicator. The specific meaning of PUCCH resource indicator can be found in 3GPP TS38.213, Section 9.2.3.

Embodiment 11

Figure 11:
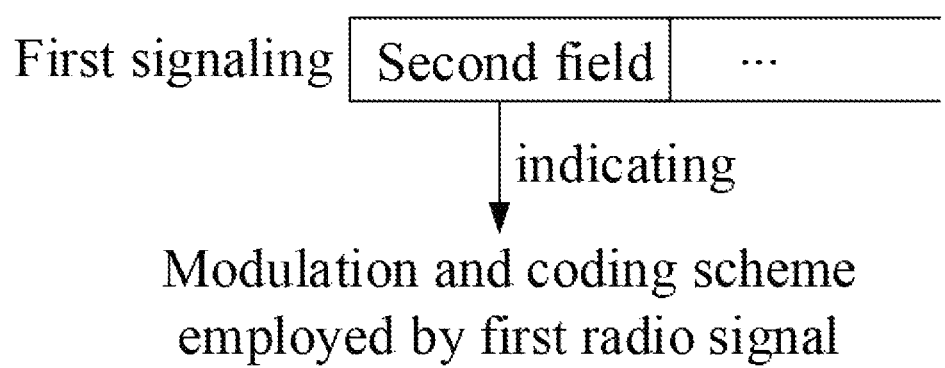
FIG. 11 illustrates a schematic diagram of a first signaling according to another embodiment of the present disclosure.

Embodiment 11 illustrates another schematic diagram of a first signaling, as shown in FIG. 11.

In Embodiment 11, the first signaling comprises a second field, the second field comprised in the first signaling is used for indicating an MCS employed by the first radio signal in the present disclosure out of the first target MCS set in the present disclosure.

In one embodiment, the first target MCS set comprises a positive integer number of MCS(s).

In one embodiment, the second field comprised in the first signaling comprises a positive integer number of bit(s).

In one embodiment, the second field comprised in the first signaling indicates an index of the MCS employed by the first radio signal in the first target MCS set.

In one embodiment, the second field comprised in the first signaling refers to Modulation and coding scheme. The specific meaning of the Modulation and coding scheme can be found in 3GPP TS38.214, Section 5.1.3.

Embodiment 12

Figure 12:
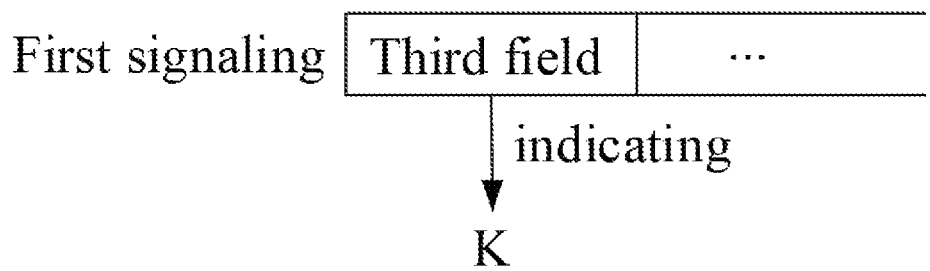
FIG. 12 illustrates a schematic diagram of a first signaling according to another embodiment of the present disclosure.

Embodiment 12 illustrates another schematic diagram of a first signaling, as shown in FIG. 12.

In Embodiment 12, the first signaling comprises a third field, the third field comprised in the first signaling is used for indicating K.

In one embodiment, the third field comprised in the first signaling comprises a positive integer number of bit(s).

In one embodiment, the third field comprised in the first signaling indicates an index of K in a second value range, the second value range is a range of values of K.

Embodiment 13

Figure 13:
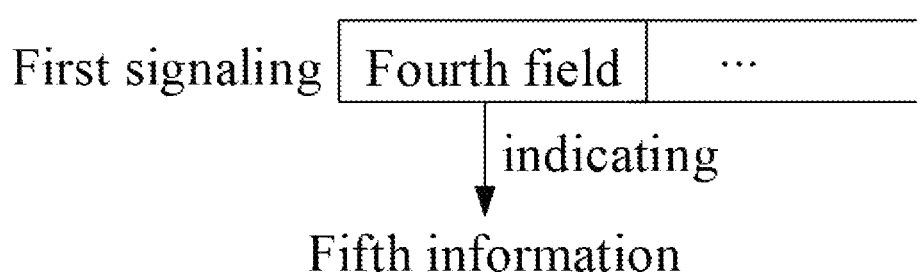
FIG. 13 illustrates a schematic diagram of a first signaling according to another embodiment of the present disclosure.

Embodiment 13 illustrates another schematic diagram of a first signaling, as shown in FIG. 13.

In Embodiment 13, the first signaling comprises a fourth field, the fourth field comprised in the first signaling comprises the fifth information in the present disclosure.

In one embodiment, the fourth field comprised in the first signaling comprises a positive integer number of bit(s).

Embodiment 14

Figure 14:
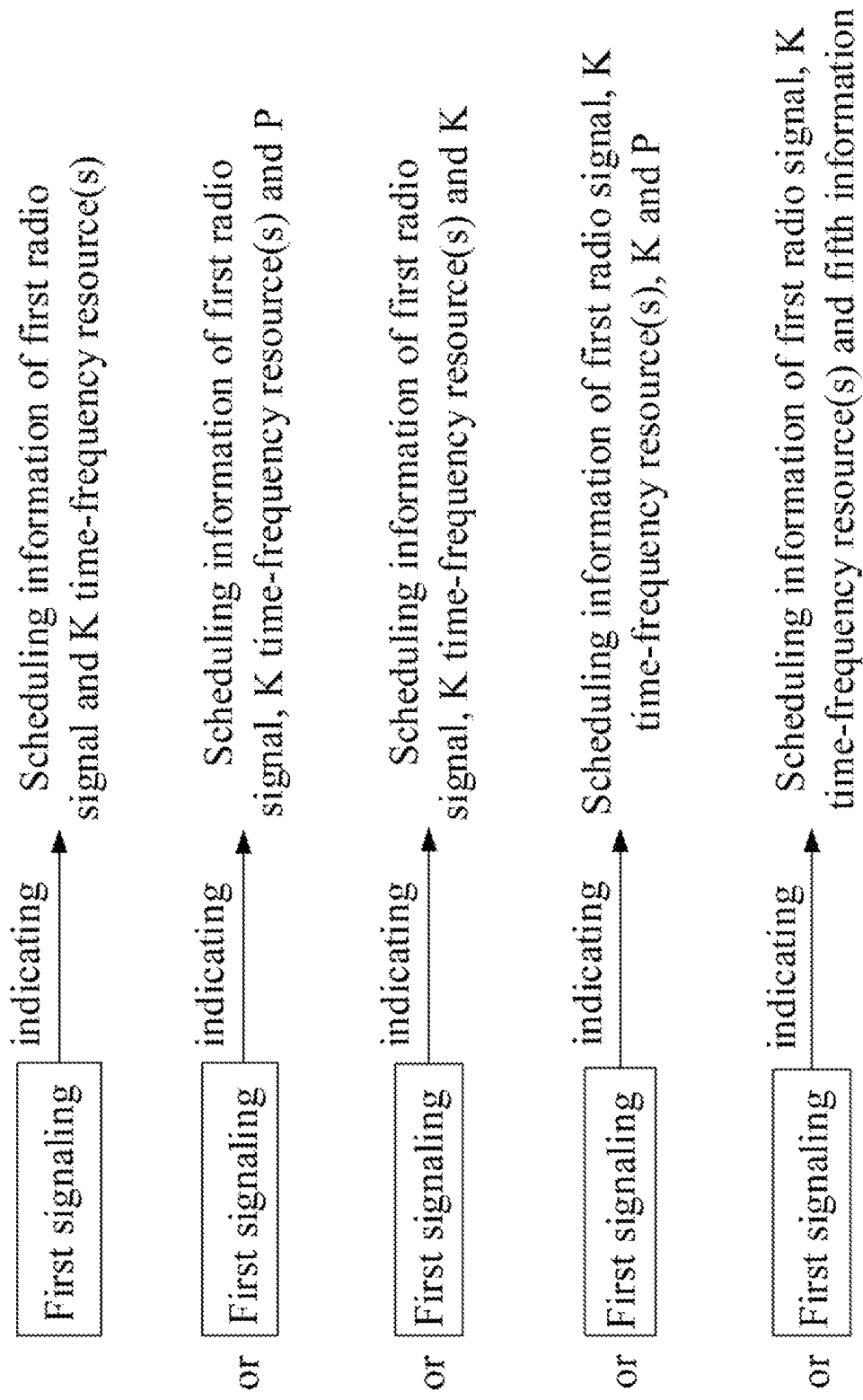
FIG. 14 illustrates a schematic diagram of a first signaling according to another embodiment of the present disclosure.

Embodiment 14 illustrates another schematic diagram of a first signaling, as shown in FIG. 14.

In Embodiment 14, the first signaling is also used for indicating scheduling information of the first radio signal in the present disclosure.

In one embodiment, the first signaling is used for indicating scheduling information of the first radio signal and the K time-frequency resource(s).

In one embodiment, the first signaling is used for indicating scheduling information of the first radio signal, the K time-frequency resource(s) and P.

In one embodiment, the first signaling is used for indicating scheduling information of the first radio signal, the K time-frequency resource(s) and K.

In one embodiment, the first signaling is used for indicating scheduling information of the first radio signal, the K time-frequency resource(s), K and P.

In one embodiment, the first signaling is used for indicating scheduling information of the first radio signal, the K time-frequency resource(s) and the fifth information in the present disclosure.

In one embodiment, the scheduling information of the first radio signal comprises at least one of occupied time domain resource, occupied frequency domain resource, MCS, configuration information of DMRS, a HARQ process number, a Redundancy Version (RV), a New Data Indicator (NDI), a transmission antenna port, corresponding multi-antenna relevant transmission and corresponding multi-antenna relevant reception.

In one sub-embodiment of the above embodiment, the MCS comprised by the scheduling information of the first radio signal is the MCS employed by the first radio signal.

In one sub-embodiment of the above embodiment, the configuration information of the DMRS comprised by the scheduling information of the first radio signal comprises at least one of RS sequence, a mapping mode, DMRS type, occupied time domain resource, occupied frequency domain resource, occupied code domain resource, cyclic shift (CS), or an Orthogonal Cover Code (OCC).

In one embodiment, the multi-antenna relevant reception refers to Spatial Rx (Receive) parameters.

In one embodiment, the multi-antenna relevant reception refers to a receiving beam.

In one embodiment, the multi-antenna relevant reception refers to a receiving beamforming matrix.

In one embodiment, the multi-antenna relevant reception refers to a receiving analog beamforming matrix.

In one embodiment, the multi-antenna relevant reception refers to a receiving analog beamforming vector.

In one embodiment, the multi-antenna relevant reception refers to a receiving beamforming vector.

In one embodiment, the multi-antenna relevant reception refers to receiving spatial filtering.

In one embodiment, the multi-antenna relevant transmission refers to Spatial Tx (Transmit) parameters.

In one embodiment, the multi-antenna relevant transmission refers to s transmitting beam.

In one embodiment, the multi-antenna relevant transmission refers to a transmitting beamforming matrix.

In one embodiment, the multi-antenna relevant transmission refers to a transmitting analog beamforming matrix.

In one embodiment, the multi-antenna relevant transmission refers to a transmitting analog beamforming vector.

In one embodiment, the multi-antenna relevant transmission refers to a transmitting beamforming vector.

In one embodiment, the multi-antenna relevant transmission refers to transmitting spatial filtering.

In one embodiment, the Spatial Tx parameters comprise one or more of a transmitting antenna port, a transmitting antenna port set, a transmitting beam, a transmitting analog beamforming matrix, a transmitting analog beamforming vector, a transmitting beamforming matrix, a transmitting beamforming vector and spatial filtering.

In one embodiment, the Spatial Rx parameters comprise one or more of a receiving beam, a receiving analog beamforming matrix, a receiving beamforming vector, a receiving beamforming matrix, a receiving beamforming vector and receiving spatial filtering.

Embodiment 15

Figure 15:
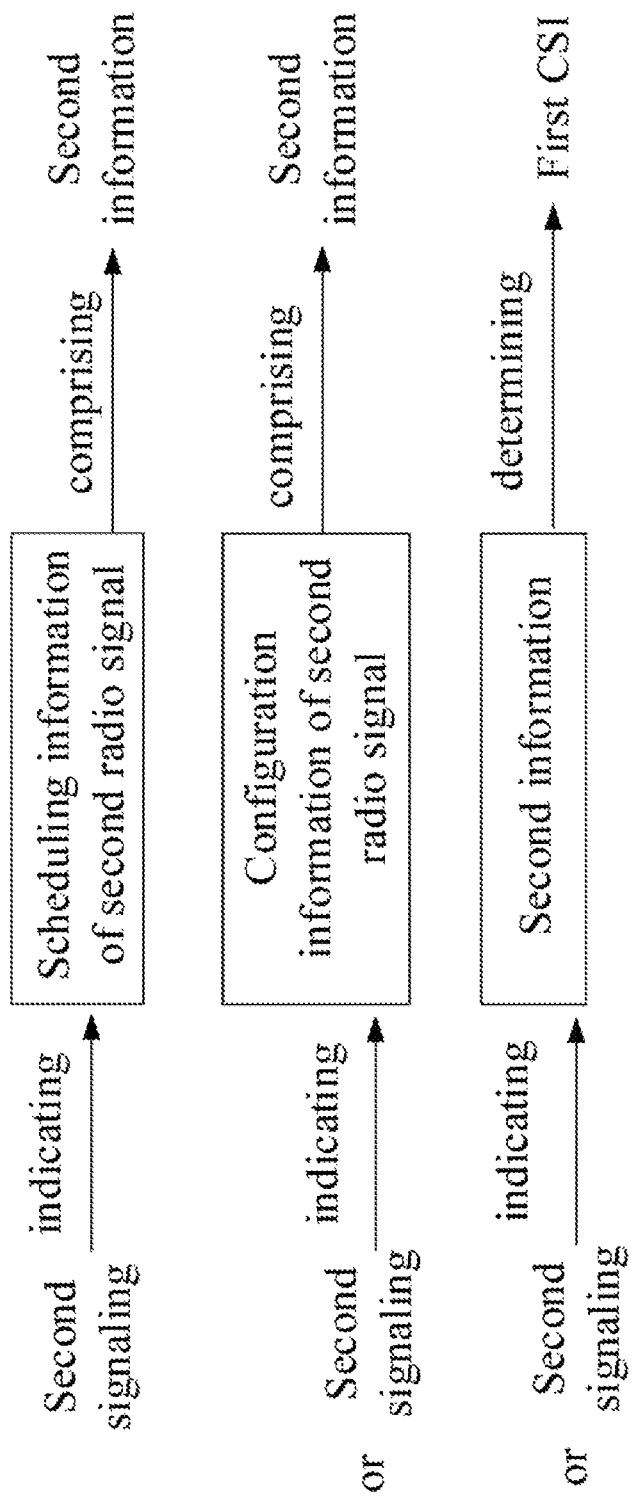
FIG. 15 illustrates a schematic diagram of a second signaling according to one embodiment of the present disclosure.

Embodiment 15 illustrates a schematic diagram of a second signaling, as shown in FIG. 15.

In Embodiment 15, a second signaling carries the second information in the present disclosure, the second information is used for determining time-frequency resources occupied by the second radio signal in the present disclosure; the second signaling indicates scheduling information of the second radio signal, or, the second signaling is used for determining configuration information of the second radio signal.

In one embodiment, the second signaling is semi-statically configured.

In one embodiment, the second signaling is carried by a higher layer signaling.

In one embodiment, the second signaling is an RRC signaling.

In one embodiment, the second signaling is a MAC CE signaling.

In one embodiment, the second signaling is dynamically configured.

In one embodiment, the second signaling is a physical layer signaling.

In one embodiment, the second signaling is a DCI signaling.

In one embodiment, the second signaling is a DCI signaling with DownLink Grant.

In one embodiment, the second signaling is a DCI signaling with UpLink Grant.

In one embodiment, the second signaling is transmitted on a downlink physical layer control channel (i.e., a downlink channel only capable of carrying a physical layer signaling).

In one sub-embodiment of the above embodiment, the downlink physical layer control channel is a PDCCH.

In one sub-embodiment of the above embodiment, the downlink physical layer control channel is an sPDCCH.

In one sub-embodiment of the above embodiment, the downlink physical layer control channel is an NR-PDCCH.

In one sub-embodiment of the above embodiment, the downlink physical layer control channel is an NB-PDCCH.

In one embodiment, the second signaling is DCI format 1_0, the specific meaning of the DCI format 1_0 can be found in 3GPP TS38.212, Section 7.3.1.2.

In one embodiment, the second signaling is DCI format 1_1, the specific meaning of the DCI format 1_1 can be found in 3GPP TS38.212, Section 7.3.1.2.

In one embodiment, the second signaling is DCI format 0_1, the specific meaning of the DCI format 0_1 can be found in 3GPP TS38.212, Section 7.3.1.1.

In one embodiment, a second signaling carries the second information, the second signaling indicates scheduling information of the second radio signal, wherein the scheduling information of the second radio signal comprises the time-frequency resources occupied by the second radio signal.

In one sub-embodiment of the above embodiment, the feedback to the second radio signal is used for indicating whether the second radio signal is correctly received.

In one sub-embodiment of the above embodiment, the second signaling is a physical layer signaling.

In one sub-embodiment of the above embodiment, the second radio signal comprises data, or the second radio signal comprises data and DMRS.

In one sub-embodiment of the above embodiment, the scheduling information of the second radio signal comprises the second information.

In one sub-embodiment of the above embodiment, the second information comprises the occupied time domain resource and the occupied frequency domain resource comprised in the scheduling information of the second radio signal.

In one sub-embodiment of the above embodiment, the scheduling information of the second radio signal also comprises the index of the MCS employed by the second radio signal in the second target MCS set.

In one sub-embodiment of the above embodiment, the MCS employed by the second radio signal is indicated by a Modulation and coding scheme field, the specific meaning of the Modulation and coding scheme field can be found in 3GPP TS38.214, Section 5.1.3.

In one embodiment, the scheduling information of the second radio signal comprises at least the occupied time domain resource and the occupied frequency domain resource of the occupied time domain resource, the occupied frequency domain resource, MCS, configuration information of DMRS, a HARQ process number, an RV, an NDI, a transmitting antenna port, corresponding multi-antenna relevant transmission and corresponding multi-antenna relevant reception.

In one sub-embodiment of the above embodiment, the configuration information of the DMRS comprised by the scheduling information of the second radio signal comprises at least one of RS sequence, a mapping mode, DMRS type, occupied time domain resource, occupied frequency domain resource, occupied code domain resource, CS, or an OCC.

In one sub-embodiment of the above embodiment, the occupied time domain resource comprised in the scheduling information of the second radio signal is a time domain resource comprised in the time-frequency resources occupied by the second radio signal.

In one sub-embodiment of the above embodiment, the occupied frequency domain resource comprised in the scheduling information of the second radio signal is a frequency domain resource comprised in the time-frequency resources occupied by the second radio signal.

In one embodiment, a second signaling carries the second information, the second signaling is used for determining configuration information of the second radio signal, wherein the configuration information of the second radio signal comprises the time-frequency resources occupied by the second radio signal.

In one sub-embodiment of the above embodiment, the feedback to the second radio signal comprises CSI generated after the measurement on the second radio signal.

In one sub-embodiment of the above embodiment, the second signaling is a higher layer signaling, the second signaling indicates the configuration information of the second radio signal.

In one sub-embodiment of the above embodiment, the second signaling is a higher layer signaling, the second signaling indicates the configuration information of the second radio signal, the second information comprises the occupied time domain resource and the occupied frequency domain resource comprised by the configuration information of the second radio signal.

In one sub-embodiment of the above embodiment, the second signaling is a higher layer signaling, the second signaling indicates the configuration information of the second radio signal, the configuration information of the second radio signal comprises the second information.

In one sub-embodiment of the above embodiment, the second signaling is a physical layer signaling, the second information is used for determining a piece of first CSI out of T0 pieces of CSI, the first CSI is one of T0 pieces of CSI, the T0 is a positive integer; the first CSI is obtained after the measurement on the second radio signal, the configuration information of the second radio signal is carried by a higher layer signaling.

In one sub-embodiment of the above embodiment, the second signaling is a physical layer signaling, the second information indicates an index of a piece of first CSI in T0 pieces of CSI, the first CSI is one of T0 pieces of CSI, the T0 is a positive integer; the first CSI is obtained after the measurement on the second radio signal, the configuration information of the second radio signal is carried by a higher layer signaling.

In one sub-embodiment of the above embodiment, the second signaling is a DCI signaling, the configuration information of the second radio signal is carried by a higher layer signaling; the second information is a CSI request field, the specific meaning of the CSI request field can be found in 3GPP TS38.212, Section 7.3.1.1.

In one embodiment, the configuration information of the second radio signal comprises at least the occupied time domain resource and the occupied frequency domain resource of occupied time domain resource, occupied frequency resource, occupied code domain resource, CS, an OCC, occupied antenna port, transmission type, corresponding multi-antenna relevant transmission and corresponding multi-antenna relevant reception.

In one sub-embodiment of the above embodiment, the second radio signal comprises a reference signal.

In one sub-embodiment of the above embodiment, the second radio signal comprises CSI-RS.

In one sub-embodiment of the above embodiment, the second radio signal comprises CSI-RS and CSI-IMR.

In one sub-embodiment of the above embodiment, the transmission type is one of periodic transmission, semi-periodic transmission and aperiodic transmission.

In one sub-embodiment of the above embodiment, the occupied time domain resource comprised in the configuration information of the second radio signal is a time domain resource comprised by the time-frequency resources occupied by the second radio signal.

In one sub-embodiment of the above embodiment, the occupied frequency domain resource comprised in the configuration information of the second radio signal is a frequency domain resource comprised by the time-frequency resources occupied by the second radio signal.

Embodiment 16

Figure 16:
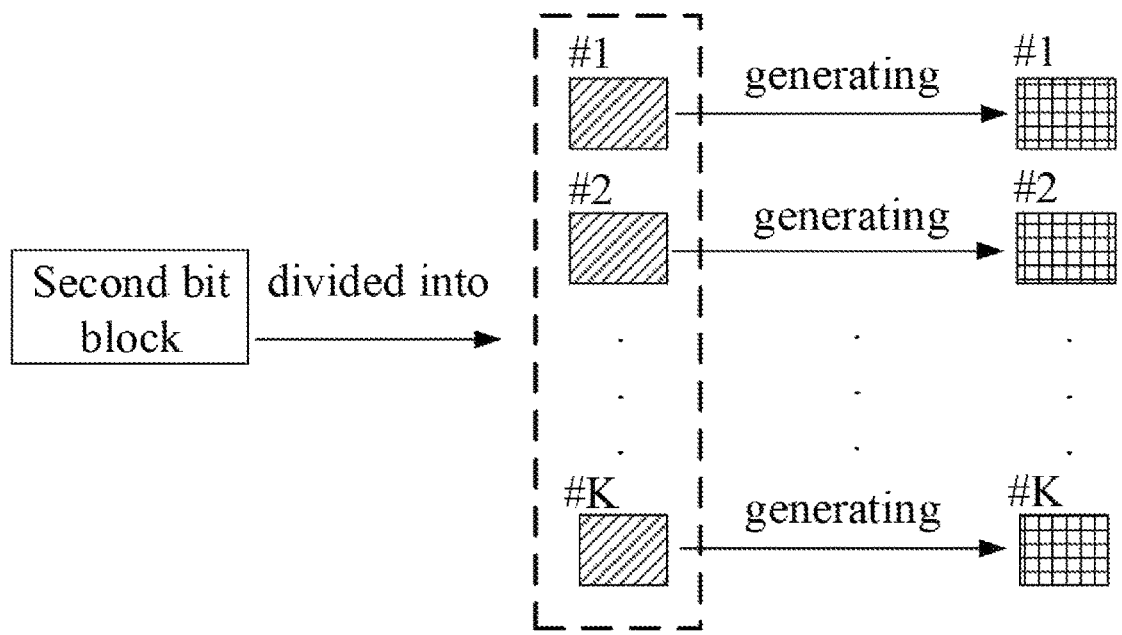
FIG. 16 illustrates a schematic diagram of generating the K first-type bit sequences according to one embodiment of the present disclosure.

Embodiment 16 illustrates a schematic diagram of generating the K first-type bit sequences, as shown in FIG. 16.

In Embodiment 16, K is greater than 1, the second bit block in the present disclosure is divided into K bit sub-blocks, any bit sub-block of the K bit sub-blocks comprises a positive integer number of bit(s); the K bit sub-blocks are respectively used for generating the K first-type bit sequences.

In one embodiment, the K bit sub-blocks are respectively used in collaboration with the first bit block for generating the K first-type bit sequences.

In one embodiment, the K bit sub-blocks are respectively used for generating the K second-type bit sequences in the present disclosure, the K first-type bit sequences are respectively generated by scrambling of the K second-type bit sequences and K scrambling sequences of the present disclosure correspondingly.

In one embodiment, the K bit sub-blocks are respectively used in collaboration with the first bit block for generating the K second-type bit sequences in the present disclosure, the K first-type bit sequences are respectively generated by scrambling of the K second-type bit sequences and K scrambling sequences of the present disclosure correspondingly.

In one embodiment, the K bit sub-blocks are respectively used for generating the K second-type bit sequences in the present disclosure, the K first-type bit sequences are respectively generated by scrambling of the K second-type bit sequences and the first scrambling sequence of the present disclosure respectively.

In one embodiment, the K bit sub-blocks are respectively used in collaboration with the first bit block for generating the K second-type bit sequences in the present disclosure, the K first-type bit sequences are respectively generated by scrambling of the K second-type bit sequences and the first scrambling sequence of the present disclosure respectively.

In one embodiment, any bit sub-blocks of the K bit sub-blocks comprise equal numbers of bits.

In one embodiment, a number of bits comprised in the second bit block is an integral multiple of K.

In one sub-embodiment of the above embodiment, any bit in the second bit block belongs to only one bit sub-block of the K bit sub-blocks, a number of bits comprised in any of the K bit sub-blocks is equal to 1/K of the number of bits comprised in the second bit block.

In one sub-embodiment of the above embodiment, the second bit block is composed of all bits comprised by the feedback to the second radio signal.

In one sub-embodiment of the above embodiment, the second bit block comprises both the feedback to the second radio signal and a third bit block, the third bit block comprises t bit(s), t being a positive integer.

In one sub-embodiment of the above embodiment, if a number of bits comprised in the feedback to the second radio signal is an integral multiple of K, the second bit block is composed of all bits comprised in the feedback to the second radio signal.

In one sub-embodiment of the above embodiment, if a number of bits comprised in the feedback to the second radio signal is not an integral multiple of K, the second bit block comprises the feedback to the second radio signal and a third bit block, the third bit block comprises t bit(s), the t being a positive integer; t is a positive integer which makes the number of bits comprised in the second bit block an integral multiple of K.

In one sub-embodiment of the above embodiment, if a number of bits comprised in the feedback to the second radio signal is not an integral multiple of K, the second bit block comprises the feedback to the second radio signal and a third bit block, the third bit block comprises t bit(s), the t being a positive integer no greater than K; t is a minimum positive integer that makes the number of bits comprised in the second bit block an integral multiple of K.

Embodiment 17

Figure 17:
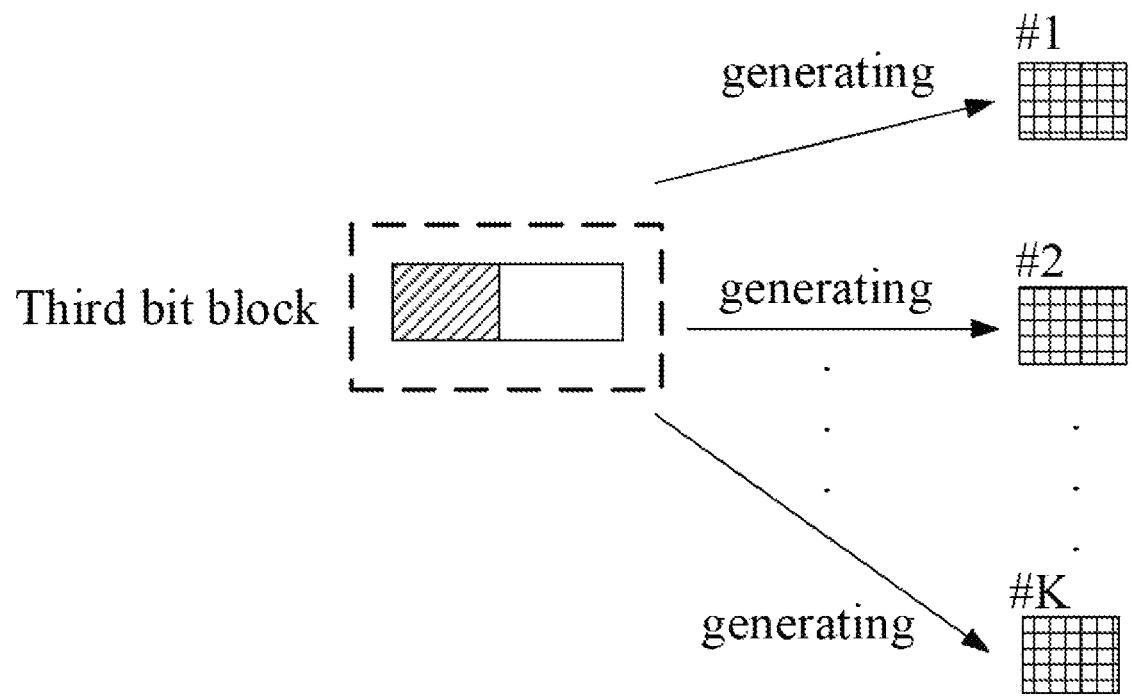
FIG. 17 illustrates a schematic diagram of generating the K first-type bit sequence(s) according to another embodiment of the present disclosure.

Embodiment 17 illustrates another schematic diagram of generating the K first-type bit sequence(s), as shown in FIG. 17.

In Embodiment 17, bit(s) comprised in the first bit block and bits comprised in the second bit block are concatenated to generate a third bit block, an output after the third bit block is inputted to channel coding is used for generating each of the K first-type bit sequence(s).

In one embodiment K is equal to 1.

In one embodiment, K is greater than 1.

In one embodiment, the first bit block comprises P bit sub-blocks, any two of the P bit sub-blocks are the same, P is a positive integer greater than 1, and any bit sub-block of the P bit sub-blocks can be used for indicating whether the first radio signal is correctly received.

In one embodiment, the second bit block is composed by all bits comprised in the feedback to the second radio signal.

In one embodiment, the second bit block comprises the feedback to the second radio signal and a third bit block, the third bit block comprises t bit(s), the t being a positive integer.

In one embodiment, a position of any bit of the first bit block in the third bit block is earlier than that of each bit of the second bit block in the third bit block.

In one embodiment, a position of any bit of the first bit block in the third bit block is later than that of each bit of the second bit block in the third bit block.

In one embodiment, an index of any bit of the first bit block in the third bit block is smaller than that of each bit of the second bit block in the third bit block.

In one embodiment, an index of any bit of the first bit block in the third bit block is greater than that of each bit of the second bit block in the third bit block.

In one embodiment, any two first-type bit sequences of the K first-type bit sequences are the same.

In one embodiment, there are two first-type bit sequences of the K first-type bit sequences that are different.

In one embodiment, at least two first-type bit sequences of the K first-type bit sequences are different.

In one embodiment, a number of bits comprised in the third bit block is used for determining the first time-frequency resource set out of the N time-frequency resource sets.

In one embodiment, any two first-type bit sequences of the K first-type bit sequences carry same bit(s) of the third bit block.

In one embodiment, there are two first-type bit sequences in the K first-type bit sequences that carry different bits of the third bit block.

In one embodiment, any two first-type bit sequences of the K first-type bit sequences have the same Redundancy Version (RV).

In one embodiment, there are two first-type bit sequences in the K first-type bit sequences having difference RVs.

In one embodiment, each of the K first-type bit sequence(s) is obtained after the third bit block is subjected to channel coding, rate matching, and scrambling.

In one embodiment, each of the K first-type bit sequence(s) is obtained after the third bit block is subjected to channel coding.

In one embodiment, each of the K first-type bit sequence(s) is obtained after the third bit block is subjected to channel coding and rate matching.

In one embodiment, each of the K first-type bit sequence(s) is obtained after the third bit block is subjected to channel coding and scrambling.

In one embodiment, an output after the third bit block is inputted to channel coding is used for generating each of the K second-type bit sequence(s), the K first-type bit sequence(s) is(are) respectively generated by scrambling of K second-type bit sequence(s) and K scrambling sequence(s) correspondingly.

In one sub-embodiment of the above embodiment, each of the K second-type bit sequence(s) is obtained after the third bit block is subjected to channel coding and rate matching; and each of the K first-type bit sequence(s) is obtained after the third bit block is subjected to channel coding, rate matching and scrambling.

In one sub-embodiment of the above embodiment, each of the K second-type bit sequence(s) is obtained after the third bit block is subjected to channel coding and rate matching; and each of the K first-type bit sequence(s) is obtained after the third bit block is subjected to channel coding, rate matching and scrambling.

In one sub-embodiment of the above embodiment, each of the K second-type bit sequence(s) is obtained after the third bit block is subjected to channel coding; and each of the K first-type bit sequence(s) is obtained after the third bit block is subjected to channel coding and scrambling.

In one embodiment, an output after the third bit block is inputted to channel coding is used for generating each of the K second-type bit sequence(s), the K first-type bit sequence(s) is(are) respectively generated after the K second-type bit sequence(s) is(are) respectively scrambled by the first scrambling sequence.

In one sub-embodiment of the above embodiment, each of the K second-type bit sequence(s) is obtained after the third bit block is subjected to channel coding and rate matching; and each of the K first-type bit sequence(s) is obtained after the third bit block is subjected to channel coding, rate matching and scrambling.

In one sub-embodiment of the above embodiment, each of the K second-type bit sequence(s) is obtained after the third bit block is subjected to channel coding; and each of the K first-type bit sequence(s) is obtained after the third bit block is subjected to channel coding and scrambling.

Embodiment 18

Figure 18:
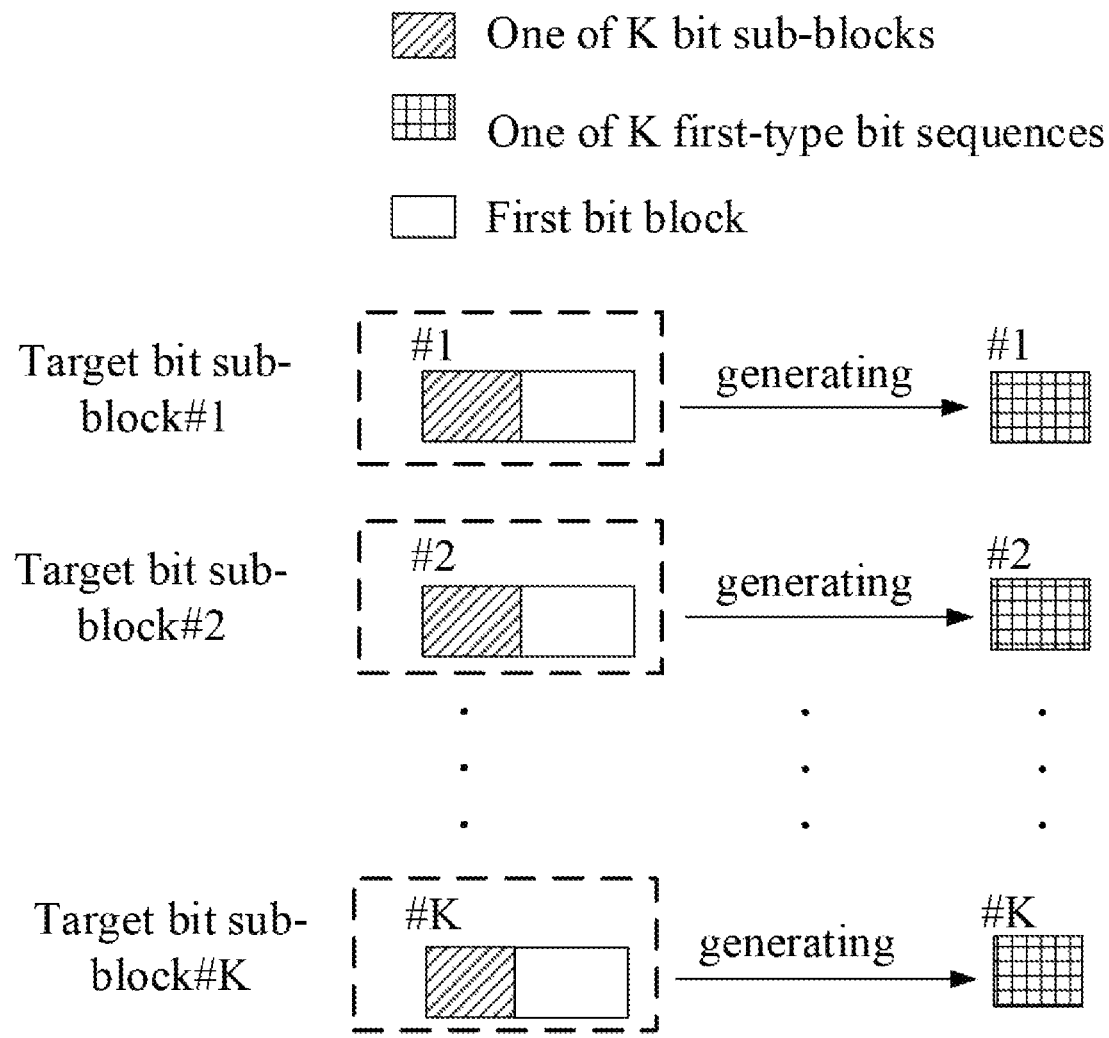
FIG. 18 illustrates a schematic diagram of K bit subblocks respectively being used for generating K first-type bit sequences according to one embodiment of the present disclosure.

Embodiment 18 illustrates a schematic diagram of K bit sub-blocks respectively being used for generating K first-type bit sequences, as shown in FIG. 18.

In Embodiment 18, K is greater than 1, bit(s) in each bit sub-block of the K bit sub-blocks is(are) concatenated with bit(s) comprised in the first bit block respectively to generate K target bit sub-blocks, outputs after the K target bit sub-blocks are respectively inputted to channel coding are used for generating the K first-type bit sequences respectively.

In one embodiment, the K target bit sub-blocks are respectively subjected to channel coding, rate matching and scrambling to respectively generate the K first-type bit sequences.

In one embodiment, the K target bit sub-blocks are respectively subjected to channel coding to respectively generate the K first-type bit sequences.

In one embodiment, the K target bit sub-blocks are respectively subjected to channel coding and rate matching to respectively generate the K first-type bit sequences.

In one embodiment, the K target bit sub-blocks are respectively subjected to channel coding and scrambling to generate the K first-type bit sequences.

In one embodiment, a given bit sub-block is any bit sub-block of the K bit sub-blocks, bits comprised in the given bit sub-block and bits comprised in the first bit block are concatenated to obtain a given target bit sub-block, the given target bit sub-block is one of the K target bit sub-blocks.

In one sub-embodiment of the above embodiment, a position of any bit of the given bit sub-block in the given target bit sub-block is earlier than that of each bit of the first bit block in the given target bit sub-block.

In one sub-embodiment of the above embodiment, a position of any bit of the given bit sub-block in the given target bit sub-block is later than that of each bit of the first bit block in the given target bit sub-block.

In one sub-embodiment of the above embodiment, an index of any bit of the given bit sub-block in the given target bit sub-block is smaller than that of each bit of the first bit block in the given target bit sub-block.

In one sub-embodiment of the above embodiment, an index of any bit of the given bit sub-block in the given target bit sub-block is greater than that of each bit of the first bit block in the given target bit sub-block.

In one embodiment, outputs after the K target bit sub-blocks are respectively inputted to channel coding are used for generating the K second-type bit sequences in the present disclosure respectively, the K first-type bit sequences are respectively generated by scrambling of the K second-type bit sequences and K scrambling sequences of the present disclosure correspondingly.

In one sub-embodiment of the above embodiment, the K target bit sub-blocks are respectively subjected to channel coding and rate matching to obtain the K second-type bit sequences respectively; the K target bit sub-blocks are respectively subjected to channel coding, rate matching and scrambling to obtain the K first-type bit sequences respectively.

In one sub-embodiment of the above embodiment, the K target bit sub-blocks are respectively subjected to channel coding to obtain the K second-type bit sequences respectively; the K target bit sub-blocks are respectively subjected to channel coding and scrambling to obtain the K first-type bit sequences respectively.

In one embodiment, outputs after the K target bit sub-blocks are respectively inputted to channel coding are used for generating the K second-type bit sequences in the present disclosure respectively, the K first-type bit sequences are respectively generated after the K second-type bit sequences are respectively scrambled by the first scrambling sequence in the present disclosure.

In one sub-embodiment of the above embodiment, the K target bit sub-blocks are respectively subjected to channel coding and rate matching to obtain the K second-type bit sequences respectively; and the K target bit sub-blocks are respectively subjected to channel coding, rate matching and scrambling to obtain the K first-type bit sequences respectively.

In one sub-embodiment of the above embodiment, the K target bit sub-blocks are respectively subjected to channel coding to obtain the K second-type bit sequences respectively; and the K target bit sub-blocks are respectively subjected to channel coding and scrambling to obtain the K first-type bit sequences respectively.

In one embodiment, any two target bit sub-blocks of the K target bit sub-blocks comprise equal numbers of bits, respectively.

In one embodiment, a number of bits comprised in one of the K target bit sub-blocks is used for determining the first time-frequency resource set out of the N time-frequency resource sets.

Embodiment 19

Figure 19:
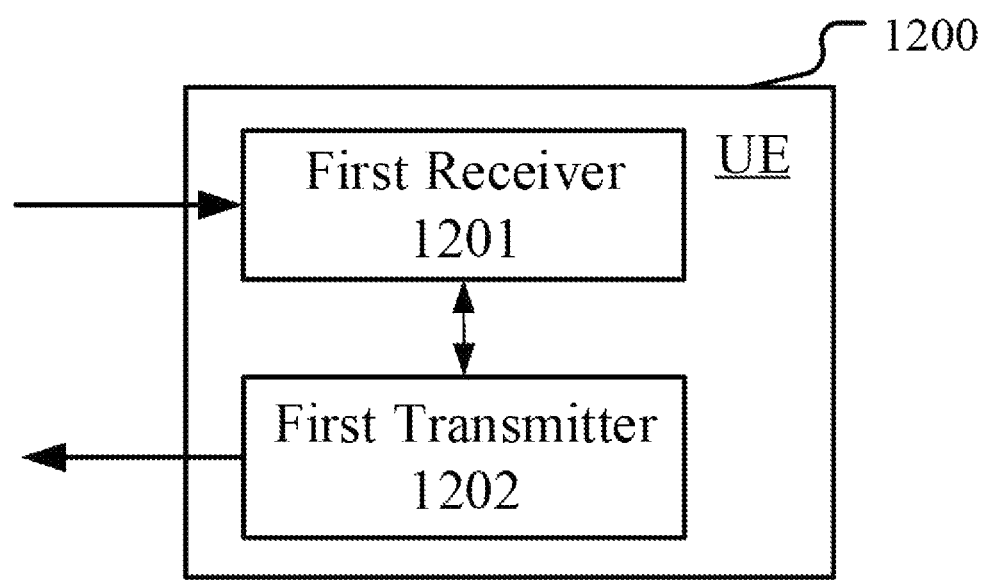
FIG. 19 illustrates a structure block diagram of a processing device in a UE according to one embodiment of the present disclosure.

Embodiment 19 illustrates a structure block diagram of a processing device in a UE, as shown in FIG. 19. In FIG. 19, a UE processing device 1200 mainly consists of a first receiver 1201 and a first transmitter 1202.

In one embodiment, the first receiver 1201 comprises the receiver 456, the receiving processor 452 and the controller/processor 490 in Embodiment 4.

In one embodiment, the first receiver 1201 comprises at least the first two of the receiver 456, the receiving processor 452 and the controller/processor 490 in Embodiment 4.

In one embodiment, the first receiver 1201 comprises the transmitter 456, the transmitting processor 455 and the controller/processor 490 in Embodiment 4.

In one embodiment, the first receiver 1201 comprises at least the first two of the transmitter 456, the transmitting processor 455 and the controller/processor 490 in Embodiment 4.

A first receiver 1201: receives a first radio signal; and receives a second radio signal; and A first transmitter 1202: transmits K first-type bit sequence(s) respectively in K time-frequency resource(s).

In Embodiment 19, a first bit block is used for indicating whether the first radio signal is correctly received, the first bit block comprises a positive integer number of bit(s); a second bit block comprises feedback to the second radio signal, the second bit block comprises a positive integer number of bit(s); each first-type bit sequence of the K first-type bit sequence(s) comprises a positive integer number of bit(s); the first bit block and the second bit block are used for generating each first-type bit sequence of the K first-type bit sequence(s); K is a positive integer.

In one embodiment, the K first-type bit sequence(s) is(are) respectively generated by scrambling of K second-type bit sequence(s) and K scrambling sequence(s) correspondingly, the first bit block and the second bit block are used for generating each of the K second-type bit sequence(s), the K scrambling sequence(s) is(are) separately generated after a scrambling sequence generator is initialized by K initial value(s) respectively.

In one embodiment, the first receiver 1201 also receives first information; and receives a first signaling; herein, the first information is used for indicating a first identifier, the first signaling is used for determining the K time-frequency resource(s); the first signaling is also used for indicating an MCS employed by the first radio signal out of a first target MCS set, the first target MCS set is an alternative MCS set of X alternative MCS sets, X is a positive integer greater than 1; the first signaling carries the first identifier, the first identifier is used for determining the first target MCS set out of the X alternative MCS sets.

In one embodiment, the first receiver 1201 also receives second information; herein, the second information is used for determining time-frequency resources occupied by the second radio signal; the feedback to the second radio signal is used for indicating whether the second radio signal is correctly received, or the feedback to the second radio signal comprises CSI generated after a measurement on the second radio signal.

In one embodiment, the first receiver 1201 also receives third information; herein, the feedback to the second radio signal is used for indicating whether the second radio signal is correctly received; the third information is used for indicating a second identifier, the second identifier is different from the first identifier, the second identifier is used for determining a second target MCS set out of the X alternative MCS sets, the second target MCS set and the first target MCS set are different; a second signaling carries the second information, the second signaling carries the second identifier, the second signaling is also used for indicating an MCS employed by the second radio signal out of the second target MCS set, a minimum target code rate of MCS s comprised in the second target MCS set is greater than a minimum target code rate of MCSs comprised in the first target MCS set.

In one embodiment, the first receiver 1201 also receives fourth information; herein, the fourth information is used for indicating N time-frequency resource sets; the first signaling is used for determining the K time-frequency resource(s) out of a first time-frequency resource set, the first time-frequency resource set is one of the N time-frequency resource sets.

In one embodiment, K is greater than 1, the second bit block is divided into K bit sub-blocks, any bit sub-block of the K bit sub-blocks comprises a positive integer number of bit(s); the K bit sub-blocks are respectively used for generating the K first-type bit sequences.

In one embodiment, K is greater than 1, bit(s) in each bit sub-block of the K bit sub-blocks is(are) concatenated with bit(s) comprised in the first bit block respectively to generate K target bit sub-blocks, outputs after the K target bit sub-blocks are respectively inputted to channel coding are used for generating the K first-type bit sequences respectively.

In one embodiment, bit(s) comprised in the first bit block and bits comprised in the second bit block are concatenated to generate a third bit block, an output after the third bit block is inputted to channel coding is used for generating each first-type bit sequence of the K first-type bit sequences.

In one embodiment, the first receiver 1201 also receives fifth information; herein, the first bit block comprises P bit sub-blocks, any two of the P bit sub-blocks are the same, P is a positive integer greater than 1, the fifth information is used for determining P, and any bit sub-block of the P bit sub-blocks can be used for indicating whether the first radio signal is correctly received.

Embodiment 20

Figure 20:
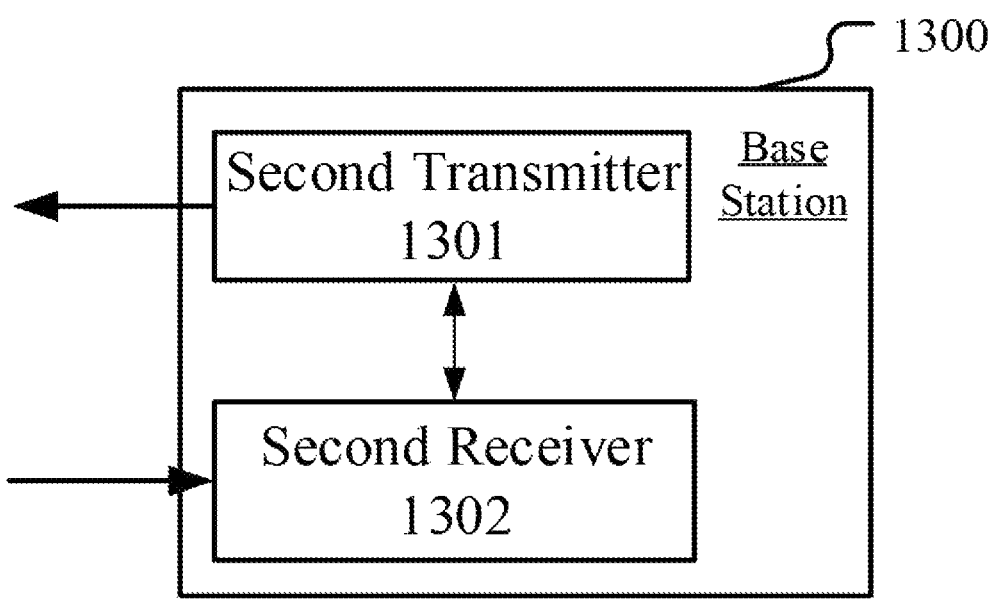
FIG. 20 illustrates a structure block diagram of a processing device in a base station according to one embodiment of the present disclosure.

Embodiment 20 illustrates a structure block diagram of a processing device in a base station, as shown in FIG. 20. In FIG. 20, a processing device 1300 in a base station mainly consists of a second transmitter 1301 and a second receiver 1302.

In one embodiment, the second transmitter 1301 comprises the transmitter 416, the transmitting processor 415 and the controller/processor 440 in Embodiment 4.

In one embodiment, the second transmitter 1301 comprises at least the first two of the transmitter 416, the transmitting processor 415 and the controller/processor 440 in Embodiment 4.

In one embodiment, the second receiver 1302 comprises the receiver 416, the receiving processor 412 and the controller/processor 440 in Embodiment 4.

In one embodiment, the second receiver 1302 comprises at least the first two of the receiver 416, the receiving processor 412 and the controller/processor 440 in Embodiment 4.

A second transmitter 1301 transmits a first radio signal; and transmits a second radio signal;

A second receiver 1302 receives K first-type bit sequence(s) respectively in K time-frequency resource(s).

In Embodiment 20, a first bit block is used for indicating whether the first radio signal is correctly received, the first bit block comprises a positive integer number of bit(s); a second bit block comprises feedback to the second radio signal, the second bit block comprises a positive integer number of bit(s); each first-type bit sequence of the K first-type bit sequence(s) comprises a positive integer number of bit(s); the first bit block and the second bit block are used for generating each first-type bit sequence of the K first-type bit sequence(s); K is a positive integer.

In one embodiment, the K first-type bit sequence(s) is(are) respectively generated by scrambling of K second-type bit sequence(s) and K scrambling sequence(s) correspondingly, the first bit block and the second bit block are used for generating each of the K second-type bit sequence(s), the K scrambling sequence(s) is(are) separately generated after a scrambling sequence generator is initialized by K initial value(s) respectively.

In one embodiment, the second transmitter 1301 also transmits first information; and transmits a first signaling; herein, the first information is used for indicating a first identifier, the first signaling is used for determining the K time-frequency resource(s); the first signaling is also used for indicating an MCS employed by the first radio signal out of a first target MCS set, the first target MCS set is an alternative MCS set of X alternative MCS sets, X is a positive integer greater than 1; the first signaling carries the first identifier, the first identifier is used for determining the first target MCS set out of the X alternative MCS sets.

In one embodiment, the second transmitter 1301 also transmits second information; herein, the second information is used for determining time-frequency resources occupied by the second radio signal; the feedback to the second radio signal is used for indicating whether the second radio signal is correctly received, or the feedback to the second radio signal comprises CSI generated after the measurement on the second radio signal.

In one embodiment, the second transmitter 1301 also transmits third information; herein, the feedback to the second radio signal is used for indicating whether the second radio signal is correctly received; the third information is used for indicating a second identifier, the second identifier is different from the first identifier, the second identifier is used for determining a second target MCS set out of the X alternative MCS sets, the second target MCS set and the first target MCS set are different; a second signaling carries the second information, the second signaling carries the second identifier, the second signaling is also used for indicating an MCS employed by the second radio signal out of the second target MCS set, a minimum target code rate of MCSs comprised in the second target MCS set is greater than a minimum target code rate of MCSs comprised in the first target MCS set.

In one embodiment, the second transmitter 1301 also transmits fourth information; herein, the fourth information is used for indicating N time-frequency resource sets; the first signaling is used for determining the K time-frequency resource(s) out of a first time-frequency resource set, the first time-frequency resource set is one of the N time-frequency resource sets.

In one embodiment, the second bit block is divided into K bit sub-blocks, any bit sub-block of the K bit sub-blocks comprises a positive integer number of bit(s); the K bit sub-blocks are respectively used for generating the K first-type bit sequences.

In one embodiment, bit(s) in each bit sub-block of the K bit sub-blocks is(are) concatenated with bit(s) comprised in the first bit block respectively to generate K target bit sub-blocks, outputs after the K target bit sub-blocks are respectively inputted to channel coding are used for generating the K first-type bit sequences respectively.

In one embodiment, bit(s) comprised in the first bit block and bits comprised in the second bit block are concatenated to generate a third bit block, an output after the third bit block is inputted to channel coding is used for generating each first-type bit sequence of the K first-type bit sequences.

In one embodiment, the second transmitter 1301 also transmits fifth information; herein, the first bit block comprises P bit sub-blocks, any two of the P bit sub-blocks are the same, P is a positive integer greater than 1, the fifth information is used for determining P, the fifth information is used for determining P, and any bit sub-block of the P bit sub-blocks can be used for indicating whether the first radio signal is correctly received.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE or terminal in the present disclosure includes but is not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station or system equipment in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) for wireless communication, comprising:
receiving first information;
receiving a first signaling;
receiving a first radio signal;
receiving a second radio signal; and
transmitting K first-type bit sequence(s) respectively in K time-frequency resource(s);
wherein a first bit block is used for indicating whether the first radio signal is correctly received, the first bit block comprises a positive integer number of bit(s); a second bit block comprises feedback to the second radio signal, the second bit block comprises a positive integer number of bit(s); each first-type bit sequence of the K first-type bit sequence(s) comprises a positive integer number of bit(s); the first bit block and the second bit block are used for generating each first-type bit sequence of the K first-type bit sequence(s); K is a positive integer; the first information is used for indicating a first identifier, the first signaling is used for determining the K time-frequency resource(s); the first signaling is also used for indicating an MCS employed by the first radio signal out of a first target MCS set, the first target MCS set is an alternative MCS set of X alternative MCS sets, X is a positive integer greater than 1; the first signaling carries the first identifier, the first identifier is used for determining the first target MCS set out of the X alternative MCS sets.

2. A method in a base station for wireless communication, comprising:
transmitting first information;
transmitting a first signaling;
transmitting a first radio signal;
transmitting a second radio signal; and
receiving K first-type bit sequence(s) respectively in K time-frequency resource(s);
wherein a first bit block is used for indicating whether the first radio signal is correctly received, the first bit block comprises a positive integer number of bit(s); a second bit block comprises feedback to the second radio signal, the second bit block comprises a positive integer number of bit(s); each first-type bit sequence of the K first-type bit sequence(s) comprises a positive integer number of bit(s); the first bit block and the second bit block are used for generating each first-type bit sequence of the K first-type bit sequence(s); K is a positive integer; the first information is used for indicating a first identifier, the first signaling is used for determining the K time-frequency resource(s); the first signaling is also used for indicating an MCS employed by the first radio signal out of a first target MCS set, the first target MCS set is an alternative MCS set of X alternative MCS sets, X is a positive integer greater than 1; the first signaling carries the first identifier, the first identifier is used for determining the first target MCS set out of the X alternative MCS sets.

3. A UE for wireless communication, comprising:
a first receiver, receiving first information; receiving a first signaling; receiving a first radio signal; and receiving a second radio signal; and
a first transmitter, transmitting K first-type bit sequence(s) respectively in K time-frequency resource(s);
wherein a first bit block is used for indicating whether the first radio signal is correctly received, the first bit block comprises a positive integer number of bit(s); a second bit block comprises feedback to the second radio signal, the second bit block comprises a positive integer number of bit(s); each first-type bit sequence of the K first-type bit sequence(s) comprises a positive integer number of bit(s); the first bit block and the second bit block are used for generating each first-type bit sequence of the K first-type bit sequence(s); K is a positive integer; the first information is used for indicating a first identifier, the first signaling is used for determining the K time-frequency resource(s); the first signaling is also used for indicating an MCS employed by the first radio signal out of a first target MCS set, the first target MCS set is an alternative MCS set of X alternative MCS sets, X is a positive integer greater than 1; the first signaling carries the first identifier, the first identifier is used for determining the first target MCS set out of the X alternative MCS sets.

4. The UE according to claim 3, wherein the K first-type bit sequence(s) is(are) respectively generated by scrambling of K second-type bit sequence(s) and K scrambling sequence(s) correspondingly, the first bit block and the second bit block are used for generating each second-type bit sequence of the K second-type bit sequence(s), the K scrambling sequence(s) is(are) separately generated after a scrambling sequence generator is initialized by K initial value(s) respectively.

5. The UE according to claim 3, wherein the first receiver also receives second information; herein, the second information is used for determining time-frequency resources occupied by the second radio signal; the feedback to the second radio signal is used for indicating whether the second radio signal is correctly received, or the feedback to the second radio signal comprises Channel Status Information (CSI) generated after a measurement on the second radio signal.

6. The UE according to claim 5, wherein the first receiver also receives third information; herein, the feedback to the second radio signal is used for indicating whether the second radio signal is correctly received; the third information is used for indicating a second identifier, the second identifier is different from the first identifier, the second identifier is used for determining a second target MCS set out of the X alternative MCS sets, the second target MCS set and the first target MCS set are different; a second signaling carries the second information, the second signaling carries the second identifier, the second signaling is also used for indicating an MCS employed by the second radio signal out of the second target MCS set, a minimum target code rate of MCSs comprised in the second target MCS set is greater than a minimum target code rate of MCSs comprised in the first target MCS set.

7. The UE according to claim 3, wherein the first receiver also receives fourth information; herein, the fourth information is used for indicating N time-frequency resource sets; the first signaling is used for determining the K time-frequency resource(s) out of a first time-frequency resource set, the first time-frequency resource set is a time-frequency resource set of the N time-frequency resource sets, N is a positive integer greater than 1.

8. The UE according to claim 3, wherein the K is greater than 1, the second bit block is divided into K bit sub-blocks, any bit sub-block of the K bit sub-blocks comprises a positive integer number of bit(s); the K bit sub-blocks are respectively used for generating the K first-type bit sequences; or, bit(s) comprised in the first bit block and bits comprised in the second bit block are concatenated to generate a third bit block, an output after the third bit block is inputted to channel coding is used for generating each first-type bit sequence of the K first-type bit sequences.

9. The UE according to claim 8, wherein the K is greater than 1, the second bit block is divided into K bit sub-blocks, any bit sub-block of the K bit sub-blocks comprises a positive integer number of bit(s); the K bit sub-blocks are respectively used for generating the K first-type bit sequences; bit(s) in each bit sub-block of the K bit sub-blocks is(are) concatenated with bit(s) comprised in the first bit block respectively to generate K target bit sub-blocks, outputs after the K target bit sub-blocks are respectively inputted to channel coding are used for generating the K first-type bit sequences respectively.

10. The UE according to claim 3, wherein the first receiver also receives fifth information; herein, the first bit block comprises P bit sub-blocks, any two of the P bit sub-blocks are the same, P is a positive integer greater than 1, the fifth information is used for determining the P, any bit sub-block of the P bit sub-blocks can be used for indicating whether the first radio signal is correctly received.

11. A base station for wireless communication, comprising:
a second transmitter, transmitting first information; transmitting a first signaling; transmitting a first radio signal; and transmitting a second radio signal;
a second receiver, receiving K first-type bit sequence(s) respectively in K time-frequency resource(s);
wherein a first bit block is used for indicating whether the first radio signal is correctly received, the first bit block comprises a positive integer number of bit(s); a second bit block comprises feedback to the second radio signal, the second bit block comprises a positive integer number of bit(s); each first-type bit sequence of the K first-type bit sequence(s) comprises a positive integer number of bit(s); the first bit block and the second bit block are used for generating each first-type bit sequence of the K first-type bit sequence(s); K is a positive integer; the first information is used for indicating a first identifier, the first signaling is used for determining the K time-frequency resource(s); the first signaling is also used for indicating an MCS employed by the first radio signal out of a first target MCS set, the first target MCS set is an alternative MCS set of X alternative MCS sets, X is a positive integer greater than 1; the first signaling carries the first identifier, the first identifier is used for determining the first target MCS set out of the X alternative MCS sets.

12. The base station according to claim 11, wherein the K first-type bit sequence(s) is(are) respectively generated by scrambling of K second-type bit sequence(s) and K scrambling sequence(s) correspondingly, the first bit block and the second bit block are used for generating each second-type bit sequence of the K second-type bit sequence(s), the K scrambling sequence(s) is(are) separately generated after a scrambling sequence generator is initialized by K initial value(s) respectively.

13. The base station according to claim 11, wherein the second transmitter also transmits second information; herein, the second information is used for determining time-frequency resources occupied by the second radio signal; the feedback to the second radio signal is used for indicating whether the second radio signal is correctly received, or the feedback to the second radio signal comprises CSI generated after a measurement on the second radio signal.

14. The base station according to claim 13, wherein the second transmitter also transmits third information; herein, the feedback to the second radio signal is used for indicating whether the second radio signal is correctly received; the third information is used for indicating a second identifier, the second identifier is different from the first identifier, the second identifier is used for determining a second target MCS set out of the X alternative MCS sets, the second target MCS set and the first target MCS set are different; a second signaling carries the second information, the second signaling carries the second identifier, the second signaling is also used for indicating an MCS employed by the second radio signal out of the second target MCS set, a minimum target code rate of MCSs comprised in the second target MCS set is greater than a minimum target code rate of MCSs comprised in the first target MCS set.

15. The base station according to claim 11, wherein the second transmitter also transmits fourth information; herein, the fourth information is used for indicating N time-frequency resource sets; the first signaling is used for determining the K time-frequency resource(s) out of a first time-frequency resource set, the first time-frequency resource set is a time-frequency resource set of the N time-frequency resource sets, N is a positive integer greater than 1.

16. The base station according to claim 11, wherein the K is greater than 1, the second bit block is divided into K bit sub-blocks, any bit sub-block of the K bit sub-blocks comprises a positive integer number of bit(s); the K bit sub-blocks are respectively used for generating the K first-type bit sequences; or, bit(s) comprised in the first bit block and bits comprised in the second bit block are concatenated to generate a third bit block, an output after the third bit block is inputted to channel coding is used for generating each first-type bit sequence of the K first-type bit sequences.

17. The base station according to claim 16, wherein the K is greater than 1, the second bit block is divided into K bit sub-blocks, any bit sub-block of the K bit sub-blocks comprises a positive integer number of bit(s); the K bit sub-blocks are respectively used for generating the K first-type bit sequences; bit(s) in each bit sub-block of the K bit sub-blocks is(are) concatenated with bit(s) comprised in the first bit block respectively to generate K target bit sub-blocks, outputs after the K target bit sub-blocks are respectively inputted to channel coding are used for generating the K first-type bit sequences respectively.

18. The base station according to claim 11, wherein the second transmitter also transmits fifth information; herein, the first bit block comprises P bit sub-blocks, any two of the P bit sub-blocks are the same, P is a positive integer greater than 1, the fifth information is used for determining the P, any bit sub-block of the P bit sub-blocks can be used for indicating whether the first radio signal is correctly received.

* * * * *